(12) United States Patent
Katzir et al.

(10) Patent No.: US 11,974,046 B2
(45) Date of Patent: Apr. 30, 2024

(54) MULTIMODALITY MULTIPLEXED ILLUMINATION FOR OPTICAL INSPECTION SYSTEMS

(71) Applicant: ORBOTECH LTD., Yavne (IL)

(72) Inventors: Yigal Katzir, Rishon Lezion (IL); Ilia Lutsker, Kfar Saba (IL); Elie Meimoun, Jerusalem (IL)

(*) Notice: Subject to any disclaimer, the term of this patent is extended or adjusted under 35 U.S.C. 154(b) by 62 days.

(21) Appl. No.: 17/274,046

(22) PCT Filed: Aug. 27, 2019

(86) PCT No.: PCT/IL2019/050958
§ 371 (c)(1),
(2) Date: Mar. 5, 2021

(87) PCT Pub. No.: WO2020/049551
PCT Pub. Date: Mar. 12, 2020

(65) Prior Publication Data
US 2021/0360140 A1    Nov. 18, 2021

Related U.S. Application Data

(60) Provisional application No. 62/727,561, filed on Sep. 6, 2018.

(51) Int. Cl.
*G01N 21/956* (2006.01)
*H04N 5/265* (2006.01)
*H04N 23/74* (2023.01)

(52) U.S. Cl.
CPC ........... *H04N 23/74* (2023.01); *G01N 21/956* (2013.01); *H04N 5/265* (2013.01); *G01N 2021/95638* (2013.01)

(58) Field of Classification Search
CPC .... H04N 5/2354; H04N 5/265; G01N 21/956; G01N 2021/95638; G01N 21/9501;
(Continued)

(56) References Cited

U.S. PATENT DOCUMENTS 5,058,982 A    10/1991 Katzir
7,046,266 B1   5/2006 Retschke et al.
(Continued)

FOREIGN PATENT DOCUMENTS

JP    2008286646 A    11/2008
JP    2014009969 A    1/2014
(Continued)

OTHER PUBLICATIONS

WIPO, ISR for PCT/IL2019/050958, dated Dec. 31, 2019.
(Continued)

*Primary Examiner* — Thai Q Tran
*Assistant Examiner* — Nienru Yang
(74) *Attorney, Agent, or Firm* — Hodgson Russ LLP

(57) ABSTRACT

An inspection system including an illumination subsystem and an image sensing subsystem, the illumination subsystem providing a plurality of illumination modalities, the system simultaneously illuminating at least two areas of an object with different ones of the plurality of illumination modalities, images of which are acquired by a single sensor forming part of the image sensing subsystem.

22 Claims, 23 Drawing Sheets

(58) Field of Classification Search
CPC ............ G01N 21/8806; G01N 21/8851; G01N 2021/8816; G01N 2021/8835; G01N 2021/8848; G01N 2021/8887; G01N 2021/9513; G01N 2021/95646; G06T 7/586
USPC .......................................................... 348/92
See application file for complete search history.

(56) References Cited

U.S. PATENT DOCUMENTS

| | | | |
|---|---|---|---|
| 7,641,365 | B2 | 1/2010 | Katzir et al. |
| 8,879,056 | B2 | 11/2014 | Zhao et al. |
| 9,989,480 | B2 | 6/2018 | Gordon et al. |
| 2002/0181233 | A1* | 12/2002 | Adler ............... G01N 21/95684 362/225 |
| 2002/0186878 | A1 | 12/2002 | Hoon et al. |
| 2004/0156043 | A1 | 8/2004 | Toker et al. |
| 2013/0016346 | A1* | 1/2013 | Romanovsky ..... G01N 21/8851 356/237.5 |
| 2015/0042983 | A1 | 2/2015 | Cohen-Erner |
| 2015/0160128 | A1* | 6/2015 | Liu ........................ G01N 21/55 356/445 |

FOREIGN PATENT DOCUMENTS

| | | |
|---|---|---|
| JP | 2014052203 A | 3/2014 |
| JP | 2014130130 A | 7/2014 |

OTHER PUBLICATIONS

EPO, Supplementary European Search Report and Search Opinion for EP Application No. 19856761, dated May 2, 2022.
JPO, Office Action for JP Application No. 2021-512758, dated Aug. 8, 2023.
JPO, Office Action for JP Application No. 2021-512758, Dec. 11, 2023.

* cited by examiner

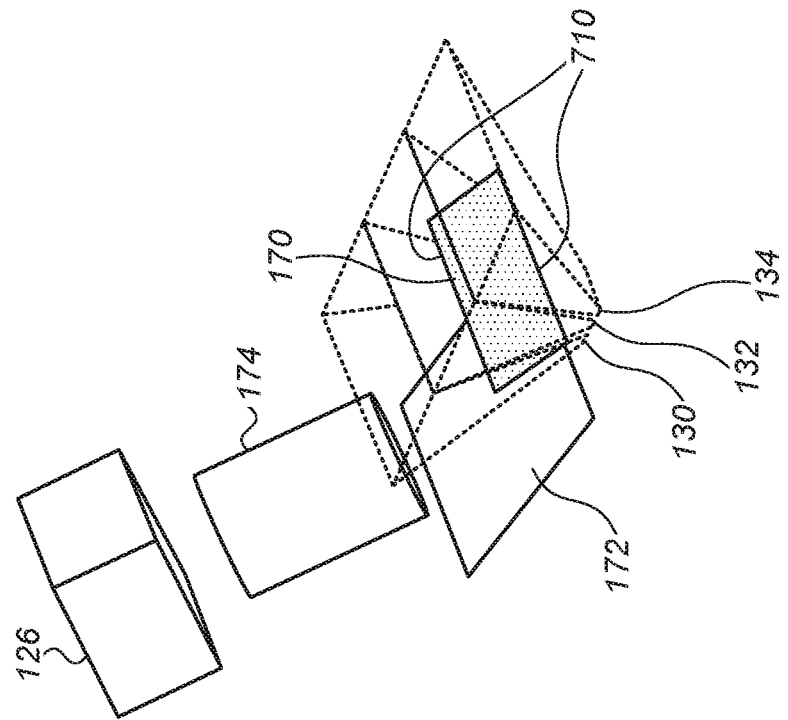
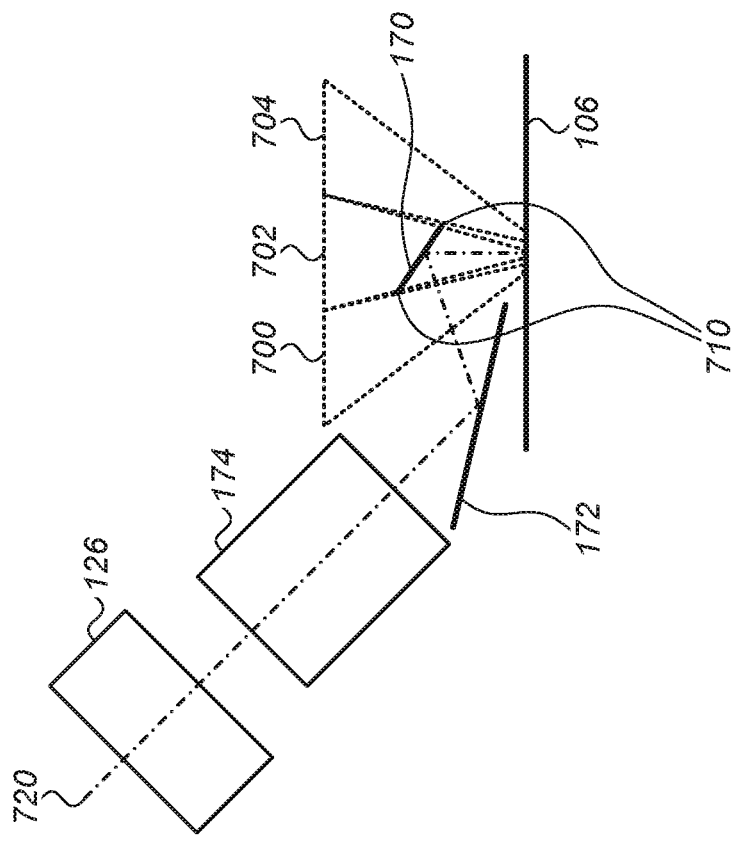
FIG. 7B
FIG. 7A

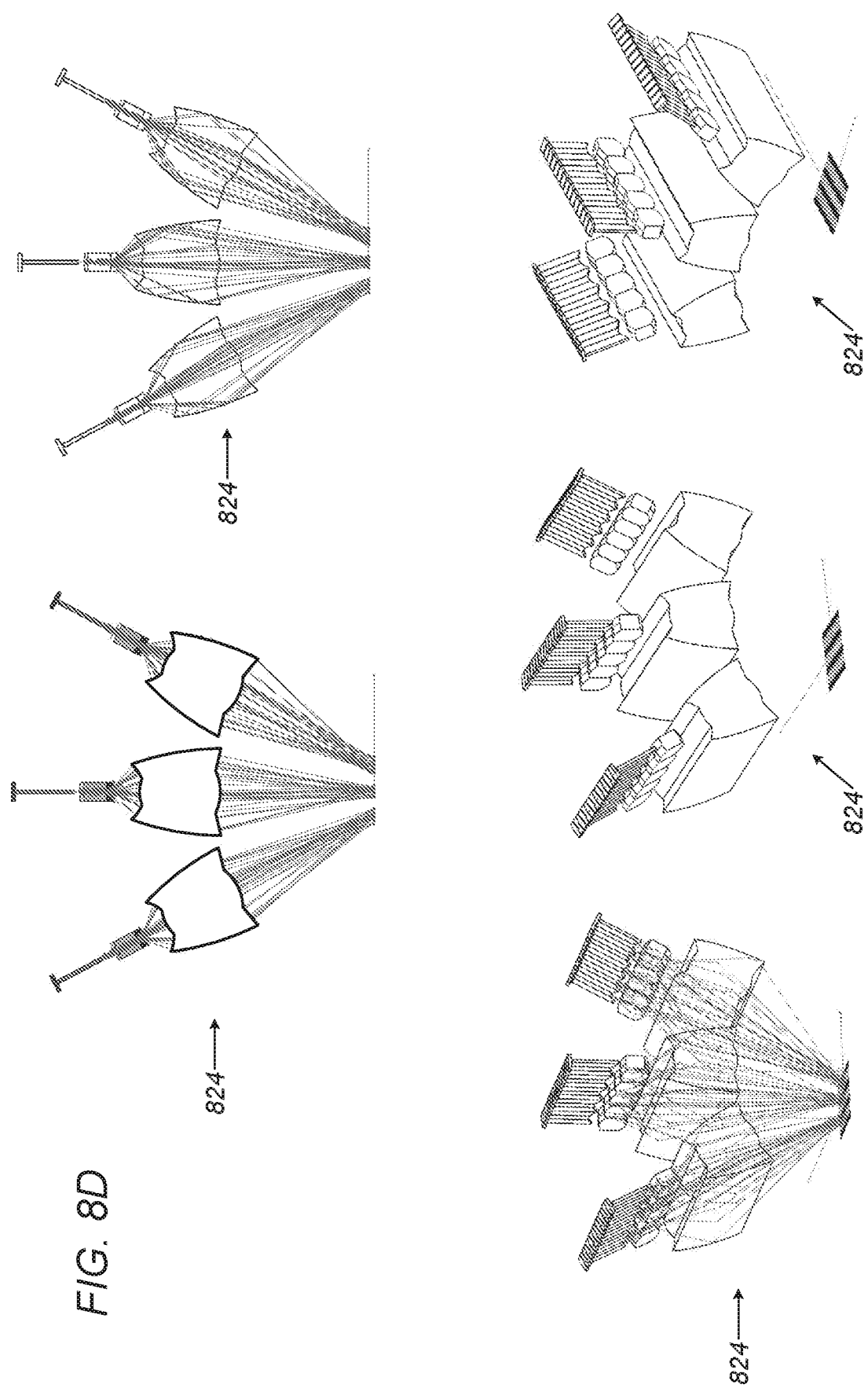

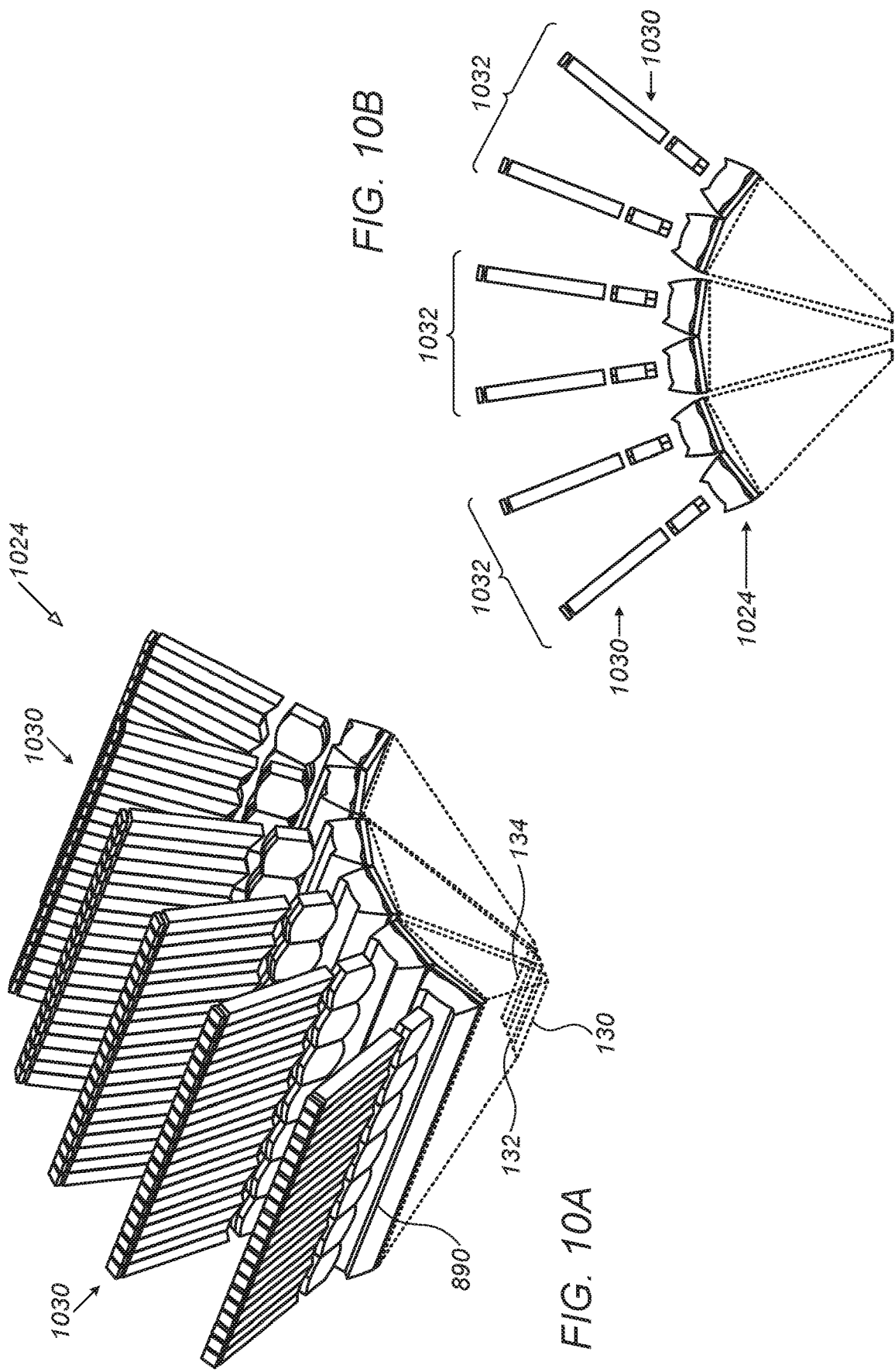

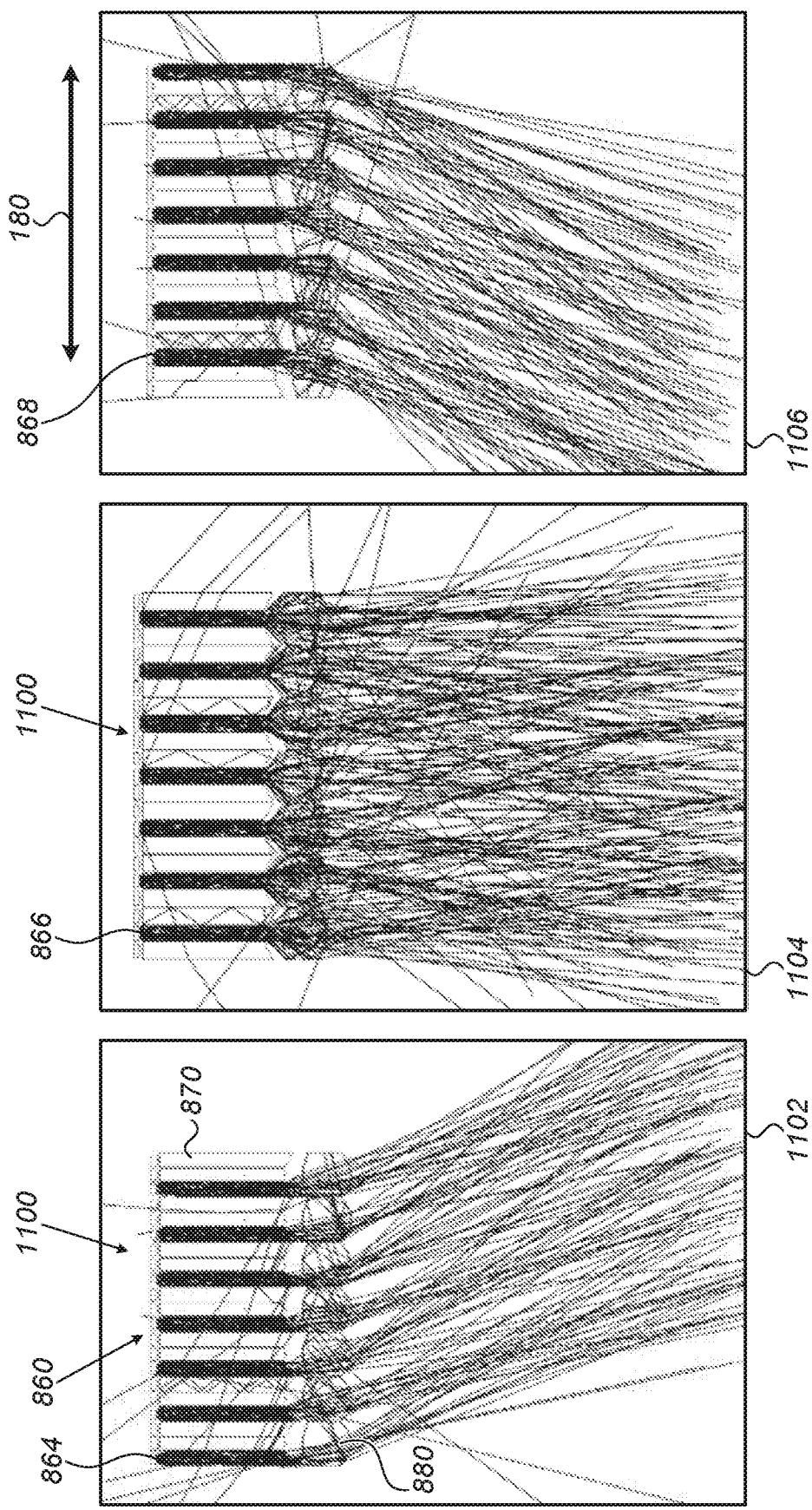

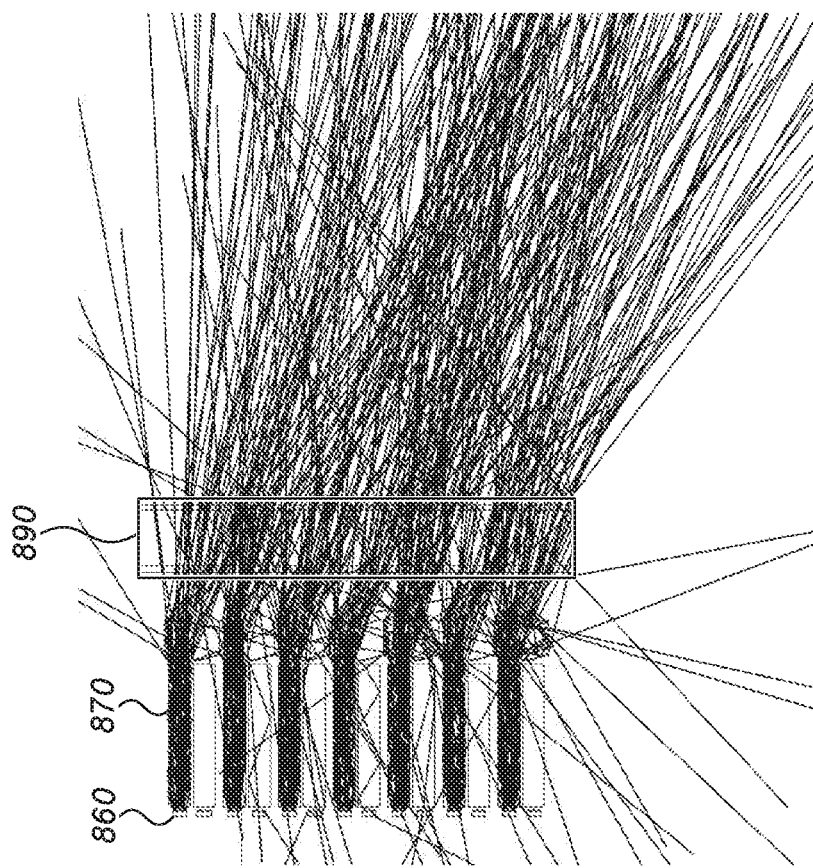
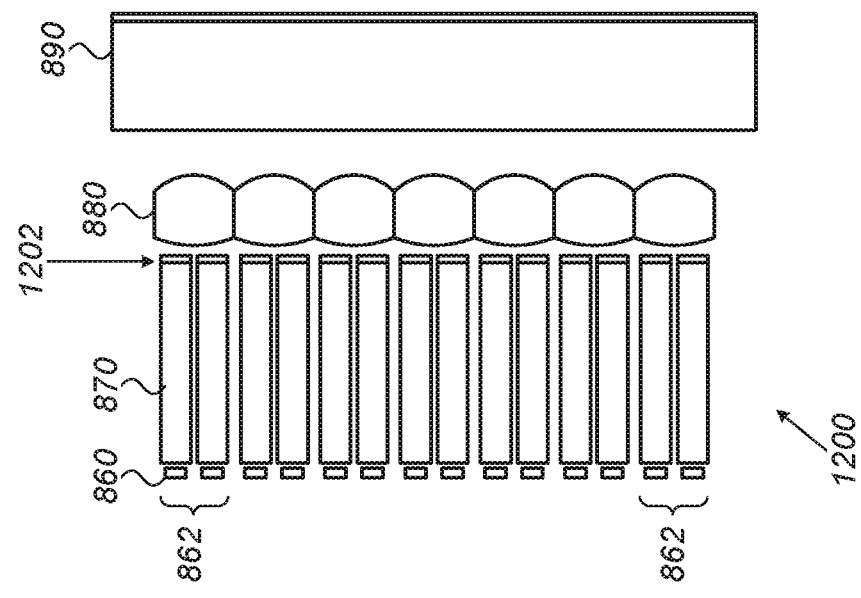
FIG. 12A
FIG. 12B

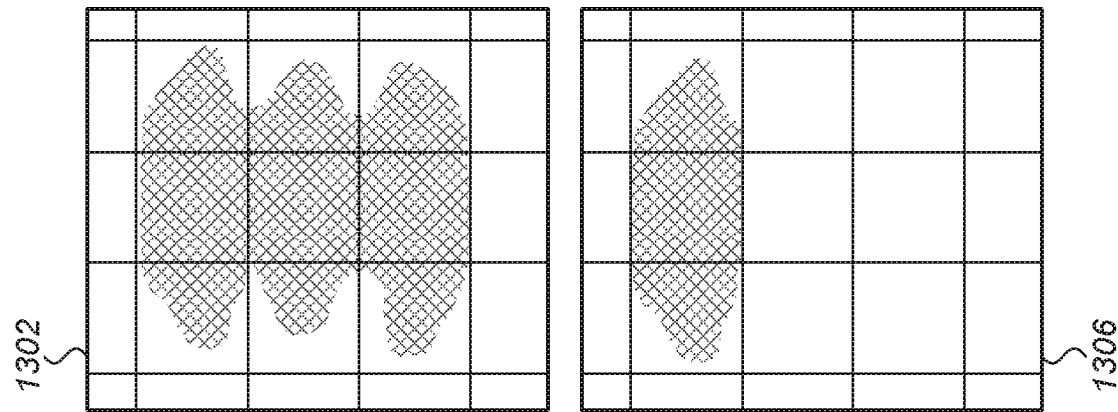
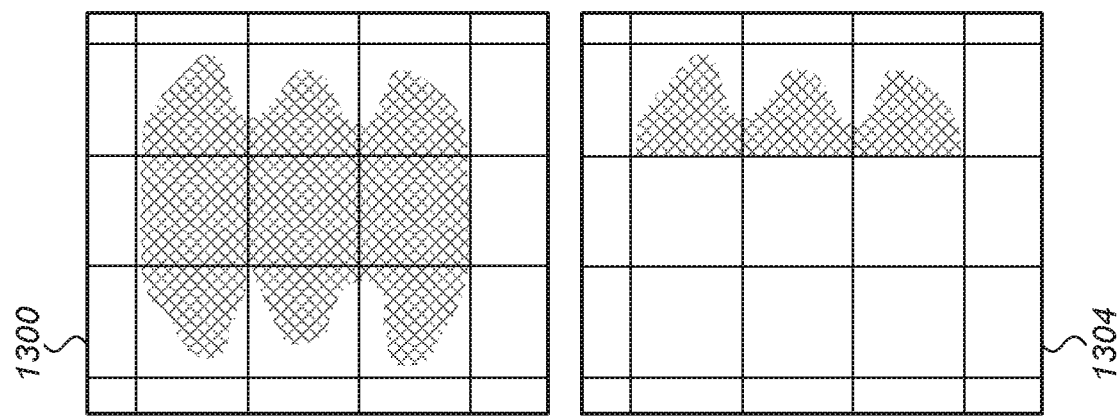
FIG. 13

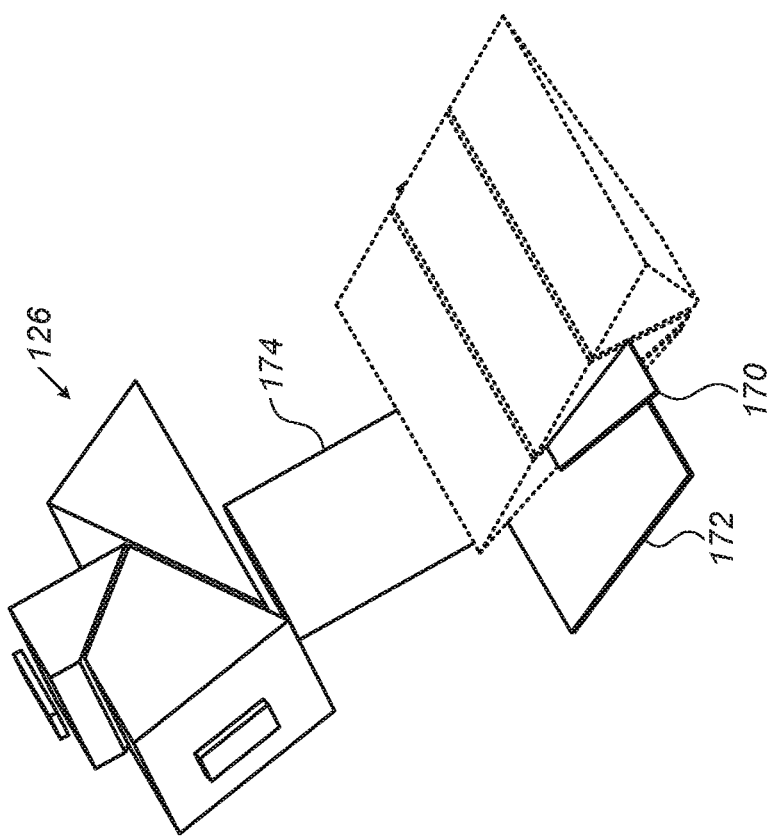
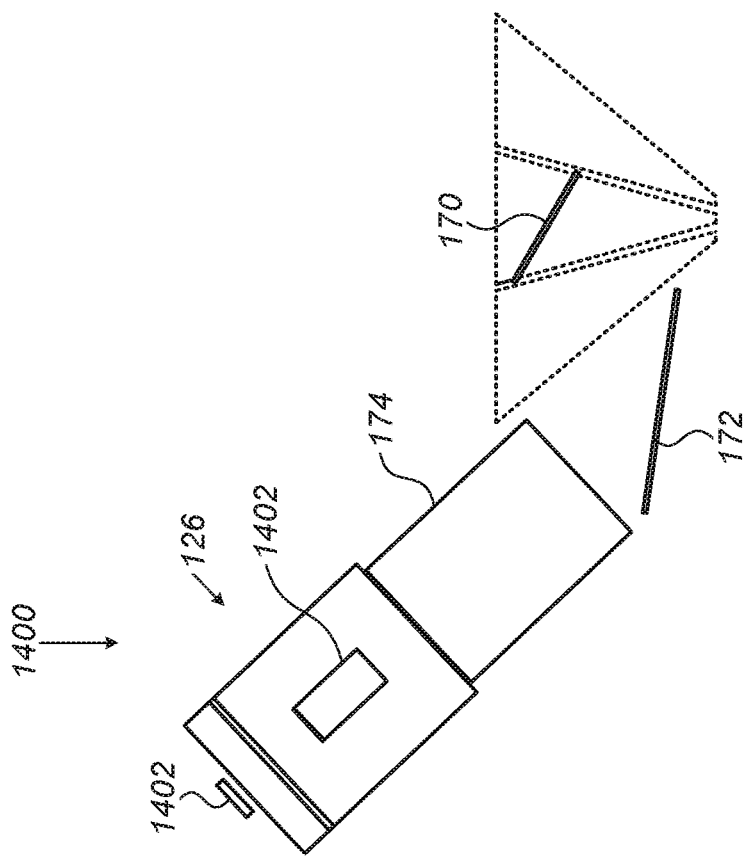
FIG. 14

MULTIMODALITY MULTIPLEXED ILLUMINATION FOR OPTICAL INSPECTION SYSTEMS

FIELD OF THE INVENTION

The present invention relates generally to optical inspection systems and more particularly to multimodality multiplexed illumination useful in optical inspection systems.

BACKGROUND OF THE INVENTION

Various types of optical inspection systems are known in the art.

SUMMARY OF THE INVENTION

The present invention seeks to provide an optical inspection system including spatially multiplexed multimodality illumination, for providing wide angle illumination having at least near full angular coverage.

There is thus provided in accordance with a preferred embodiment of the present invention an inspection system including an illumination subsystem and an image sensing subsystem, the illumination subsystem providing a plurality of illumination modalities, the system simultaneously illuminating at least two areas of an object with different ones of the plurality of illumination modalities, images of which are acquired by a single sensor forming part of the image sensing subsystem.

Preferably, the sensor includes an area sensor.

Preferably, the at least two areas of the object are mutually non-contiguous.

Preferably, the illumination subsystem includes at least two light modules respectively illuminating the at least two areas of the object with the different ones of the plurality of illumination modalities.

Preferably, the object and the inspection system are in at least near continuous relative motion along a scan direction.

Preferably, the illumination subsystem is strobed to illuminate the at least two areas of the object during the at least near continuous relative motion.

Preferably, the at least two light modules are mutually physically spaced apart by spaces along the scan direction and the plurality of illumination modalities include different angular modalities of illumination.

Preferably, the system also includes a beam splitter directing illumination from the at least two areas towards the sensor, the beam splitter being positioned such that edges thereof lie within the spaces.

Preferably, each of the at least two light modules provides at least two additional modalities of illumination in a cross-scan direction, generally orthogonal to the scan direction.

In accordance with a preferred embodiment of the present invention, the at least two additional modalities of illumination include different wavelength-encoded modalities.

Additionally or alternatively, the at least two additional modalities of illumination include different polarization-encoded modalities.

Further additionally or alternatively, the at least two additional modalities of illumination include different temporal modalities.

Preferably, the illumination subsystem includes a multiplicity of light sources directing light towards at least one transmissive concentrator element.

Alternatively, the illumination subsystem includes a multiplicity of light sources directing light towards at least one reflective concentrator element.

In accordance with a preferred embodiment of the present invention, the multiplicity of light sources includes an array of light sources outputting light to a corresponding array of light guides.

Preferably, the system also includes an array of light shaping elements, at least one light guide of the array of light guides outputting light to each light shaping element.

Preferably, the system also includes an image processing subsystem for processing the images.

Preferably, the processing includes co-registration of the images.

Additionally or alternatively, the processing includes demultiplexing of the images.

Preferably, the illumination provided by the illumination subsystem extends over an angular range of at least ±45°.

There is also provided in accordance with another preferred embodiment of the present invention a method for inspecting an object including simultaneously illuminating at least two areas of an object with different ones of a plurality of illumination modalities and acquiring images of the at least two areas by a single sensor.

Preferably, the sensor includes an area sensor.

Preferably, the at least two areas of the object are mutually non-contiguous.

Preferably, the illuminating is performed by at least two light modules respectively illuminating the at least two areas of the object with the different ones of the plurality of illumination modalities.

Preferably, the object and the at least two light modules are in at least near continuous relative motion along a scan direction.

Preferably, the illuminating includes strobing of the at least two light modules during the at least near continuous relative motion.

Preferably, the at least two light modules are mutually physically spaced apart by spaces along the scan direction and the plurality of illumination modalities include different angular modalities of illumination.

Preferably, the method also includes directing illumination from the at least two areas towards the sensor by a beam splitter, the beam splitter being positioned such that edges thereof lie within the spaces.

Preferably, the method also includes illuminating the at least two areas of the object with at least two additional modalities of illumination in a cross-scan direction, generally orthogonal to the scan direction.

In accordance with a preferred embodiment of the method of the present invention, the at least two additional modalities of illumination include different wavelength-encoded modalities.

Additionally or alternatively, the at least two additional modalities of illumination include different polarization-encoded modalities.

Further additionally or alternatively, the at least two additional modalities of illumination include different temporal modalities.

Preferably, the illuminating is performed by a multiplicity of light sources directing light towards at least one transmissive concentrator element.

Alternatively, the illuminating is performed by a multiplicity of light sources directing light towards at least one reflective concentrator element.

In accordance with a preferred embodiment of the method of the present invention, the multiplicity of light sources includes an array of light sources outputting light to a corresponding array of light guides.

Preferably, the method also includes providing an array of light shaping elements, at least one light guide of the array of light guides outputting light to each light shaping element.

Preferably, the method also includes processing the images following the acquiring.

Preferably, the processing includes co-registering the images.

Additionally or alternatively, the processing includes demultiplexing of the images.

Preferably, the illuminating includes illuminating over an angular range of at least 45°.

BRIEF DESCRIPTION OF THE DRAWINGS

The present invention will be understood and appreciated more fully from the following detailed description, taken in conjunction with the drawings in which:

FIGS. 7A and 7B are simplified respective front and perspective view illustrations of an arrangement of optical elements shown with respect to illumination output of a system of the type shown in FIGS. 1A-2B;

FIGS. 8A-8D are simplified perspective, front, side and collective view illustrations of a multimodality illuminator constructed and operative in accordance with a preferred embodiment of the present invention, suitable for providing multimodality multiplexed illumination;

FIGS. 10A and 10B are simplified perspective and front view illustrations of a multimodality illuminator constructed and operative in accordance with yet another preferred embodiment of the present invention, suitable for providing multimodality multiplexed illumination:

FIGS. 11A-11F are simplified diagrams illustrating sequential light output from a portion of a multimodality illuminator of a type illustrated in any of FIGS. 8A-10B and FIG. 11G is a simplified diagram illustrating instantaneous light output from a portion of a multimodality illuminator of a type illustrated in any of FIGS. 8A-10B;

FIGS. 12A and 12B are simplified diagrams illustrating light output from a portion of a multimodality illuminator constructed and operative in accordance with another preferred embodiment of the present invention:

FIG. 13 is a simplified graphical representation of angular coverage of illumination provided by a multimodality illuminator of a type illustrated in any of FIGS. 8A-9B; and FIGS. 14, 15, 16A and 16B are simplified illustrations of various possible arrangements of optical elements useful for performing demultiplexing of multiplexed illumination provided by systems of the types illustrated in FIGS. 8A-12B.

DETAILED DESCRIPTION OF PREFERRED EMBODIMENTS

Figure 1A:
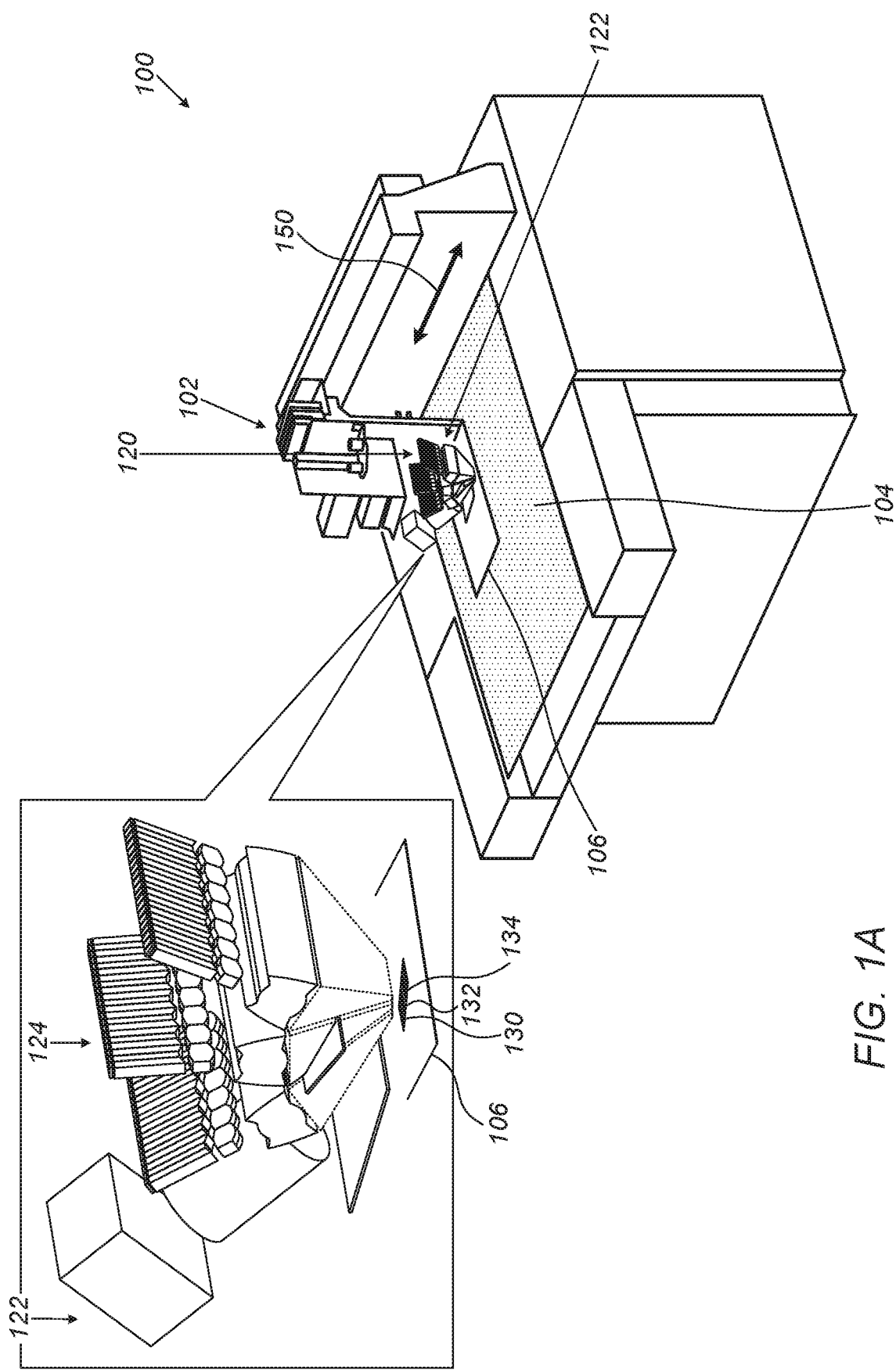
FIG. 1A is a simplified illustration of an optical inspection system including multimodality multiplexed illumination, constructed and operative in accordance with a preferred embodiment of the present invention.
Figure 1B:
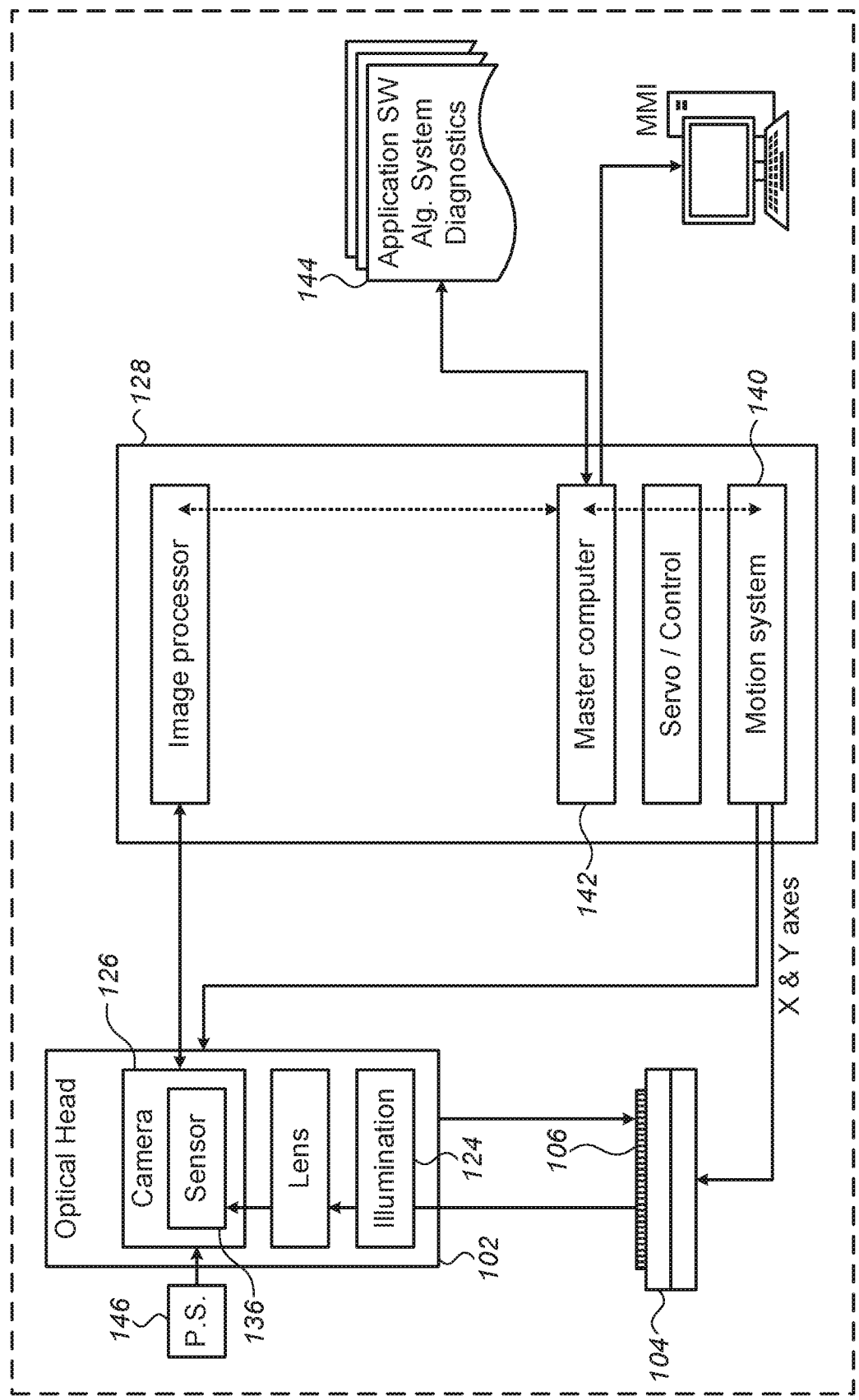
FIG. 1B is a simplified block diagram representation of components of an optical inspection system including multimodality multiplexed illumination of the type illustrated in FIG. 1A.

Reference is now made to FIG. 1A, which is a simplified illustration of an optical inspection system including multimodality multiplexed illumination, constructed and operative in accordance with a preferred embodiment of the present invention; and to FIG. 1B, which is a simplified block diagram representation of components of an optical inspection system including multimodality multiplexed illumination of the type illustrated in FIG. 1A.

As seen in FIGS. 1A and 1B, there is provided an optical inspection system 100 preferably including an optical head 102 mounted in spaced relation to a table 104. Table 104 is preferably adapted for placement thereon of an object 106 for illumination and inspection by optical head 102, here shown, by way of example, to be embodied as a printed circuit board (PCB) substrate 106. It is appreciated, however, that object 106 may be embodied as any object suitable for inspection by optical inspection system 100 including, by way of example only, wafers or wafer dies, assembled PCBs, flat panel displays and solar energy wafers.

Optical inspection system 100 preferably includes an illumination subsystem 120, preferably providing a plurality of illumination modalities, and an image sensing subsystem 122. Here, by way of example only, illumination subsystem 120 is seen to comprise an illuminator 124 and image sensing subsystem 122 is seen to comprise a camera 126, operation of which illuminator 124 and camera 126 is preferably controlled by image processing and control electronics 128, as seen in FIG. 1B.

It is particular feature of a preferred embodiment of the present invention that optical inspection system 100 preferably simultaneously illuminates at least two areas of object 106, such as first, second and third areas 130, 132, 134 seen in FIG. 1A, with different ones of the plurality of illumination modalities provided by illumination subsystem 120. Images of the at least two areas illuminated by illumination subsystem 120 are preferably acquired by a single sensor 136 included in camera 126. Sensor 136 is preferably an area sensor and preferably forms a part of the image sensing subsystem 122.

Images acquired by image sensing subsystem 122, following image processing as carried out by processing and control electronics 128, preferably provide wide illumination angle coverage of object 106. Furthermore, such wide illumination angle coverage may, depending on the particular application, exhibit near full or full coverage over the angular range thereof, with negligible angular gaps therein, thereby advantageously providing both wide and at least almost gap-free angular coverage of object 106, as is further detailed henceforth with reference to FIGS. 2A and 2B.

Optical inspection system 100 is preferably operative to perform continuous scanning of substrate 106. During scanning, substrate 106 is preferably in continuous motion relative to optical head 102 and illuminator 124 is preferably periodically strobed in order to illuminate substrate 106 at times corresponding to predetermined positions of substrate 106 with respect to illuminator 124, as is further detailed henceforth. Camera 126 is preferably operative to acquire images of substrate 106 as illuminated by the plurality of illumination modalities provided by illuminator 124.

Motion of optical head 102 and table 104 may be controlled by a motion subsystem 140. Precise timing of strobing of illuminator 124 and corresponding image acquisition by camera 126 may be controlled by a master computer 142 including various control and processing algorithms 144. Power may be supplied to both illuminator 124 and camera 126 by a power supply module 146 preferably included in optical head 102.

It is understood that the continuous relative motion of substrate 106 with respect to optical head 102 may be created by motion of optical head 102 along a scan direction 150 as substrate 106 remains stationary. Alternatively, such continuous relative motion may be by way of motion of substrate 106 with respect to a stationary optical head 102 or by way of motion of both substrate 106 and optical head 102 with respect to each other. It is appreciated that although the operation of system 100 is described hereinbelow with respect to motion of optical head 102 along scan direction 150 relative to stationary substrate 106, the principles of operation may be correspondingly applied to other modes of motion resulting in continuous relative motion of substrate 106 and optical head 102 along scan direction 150.

It is understood that the inspection system 100 of the present invention is thus preferably operated in a continuous scan mode, wherein illuminator 124 is strobed synchronously with respect to the motion of substrate 106 in relation to optical head 102, in order to acquire images of substrate 106 by area sensor 136. The operation of system 100 in a continuous scan mode facilitates a high scanning speed, which high scanning speed is particularly desirable in electronic substrate inspection.

Furthermore, the performance of continuous scanning in combination with the use of an area sensor for image acquisition, such as area sensor 136, rather than a line type image sensor improves the efficiency of light provision to camera 126, allowing camera 126 to perform image acquisition at a higher speed than would otherwise be the case should a line type image sensor be employed. Additionally or alternatively, the improved light efficiency arising from the use of area sensor 136 may be utilized towards a simpler and more reliable illuminator, as is further detailed below.

The improved light efficiency preferably achieved in the present invention by employing area type sensor 136 rather than a line type image sensor may be attributed to several factors. Firstly, the use of area type sensor 136 leads to a better area efficiency of corresponding illuminator 124, since the illuminated field of camera 126 may be substantially the same size as the effective camera field of view (FOV), thus reducing the amount of light wasted. In contrast, should a line sensor be employed, illuminator 124 may illuminate an area much wider than the line field of view sensed by the camera, thus resulting in wasted light.

The improved efficiency of illumination due to the use of an area rather than line type image sensor may be appreciated by considering the imaging of a 20 mm wide strip on an object such as object 106. In the case of a line sensor being used to perform such imaging, the instantaneous FOV imaged by the camera may typically be 10 μm 'deep' in the scan direction, meaning that the line camera 'sees' an area of 20 mm by 10 μm. In order to properly illuminate this FOV, the illuminator should uniformly illuminate a field that is larger by +0.5 mm in each dimension. The actual illuminated strip that would be uniformly illuminated, due to practical design and construction considerations, would be approximately 21 mm by 1 mm, resulting in an about 100 fold waste of light energy provided to object 106. In contrast, in the case of an area sensor being used to perform imaging of a 20 mm wide strip in accordance with preferred embodiments of the present invention, the camera FOV is comprised of several strip-like regions each measuring about 20 mm by 2 mm. Under similar practical design and construction considerations, each uniformly illuminated region would now be approximately 21 mm by 3 mm, resulting in only a 33 percent waste of light energy provided to object 106.

Additionally, the use of area type sensor 136 allows illuminator 124 to be operated with light strobes of a shorter duty cycle than would be feasible should a line type sensor be employed. The duty cycle typically is generally equal to the inverse of the sensor row count increment for each illumination modality along scan direction 150, which may be in the range 100-5000 in sensor 136. A reduced duty cycle may allow increased light levels while reducing cooling and electrical driving needs, thus achieving lower system complexity and cost.

Still further advantages will become apparent based on the detailed description provided hereinbelow.

Figure 2A:
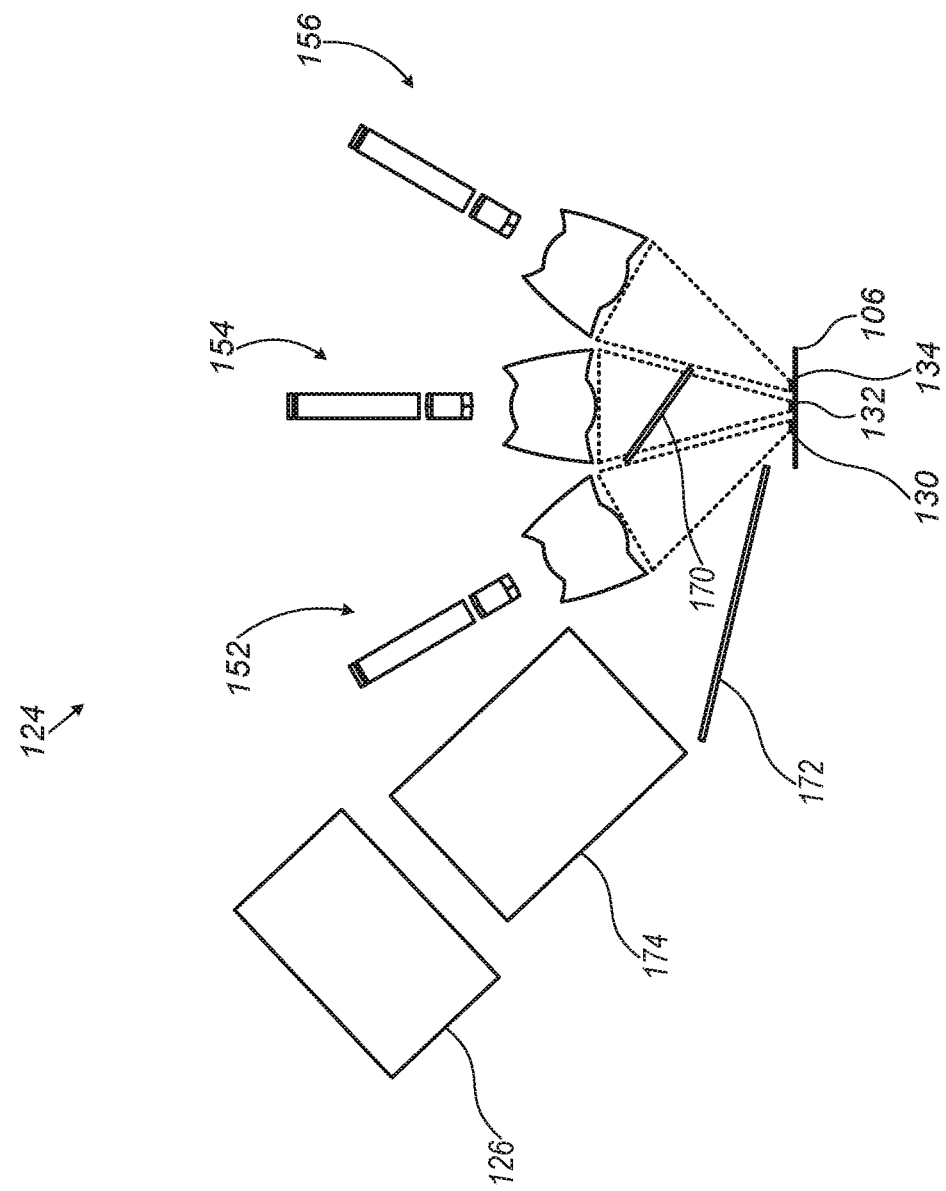
FIGS. 2A and 2B are simplified respective front and perspective view illustrations of illumination and image acquisition components in an optical inspection system of the type illustrated in FIGS. 1A and 1B.
Figure 2B:
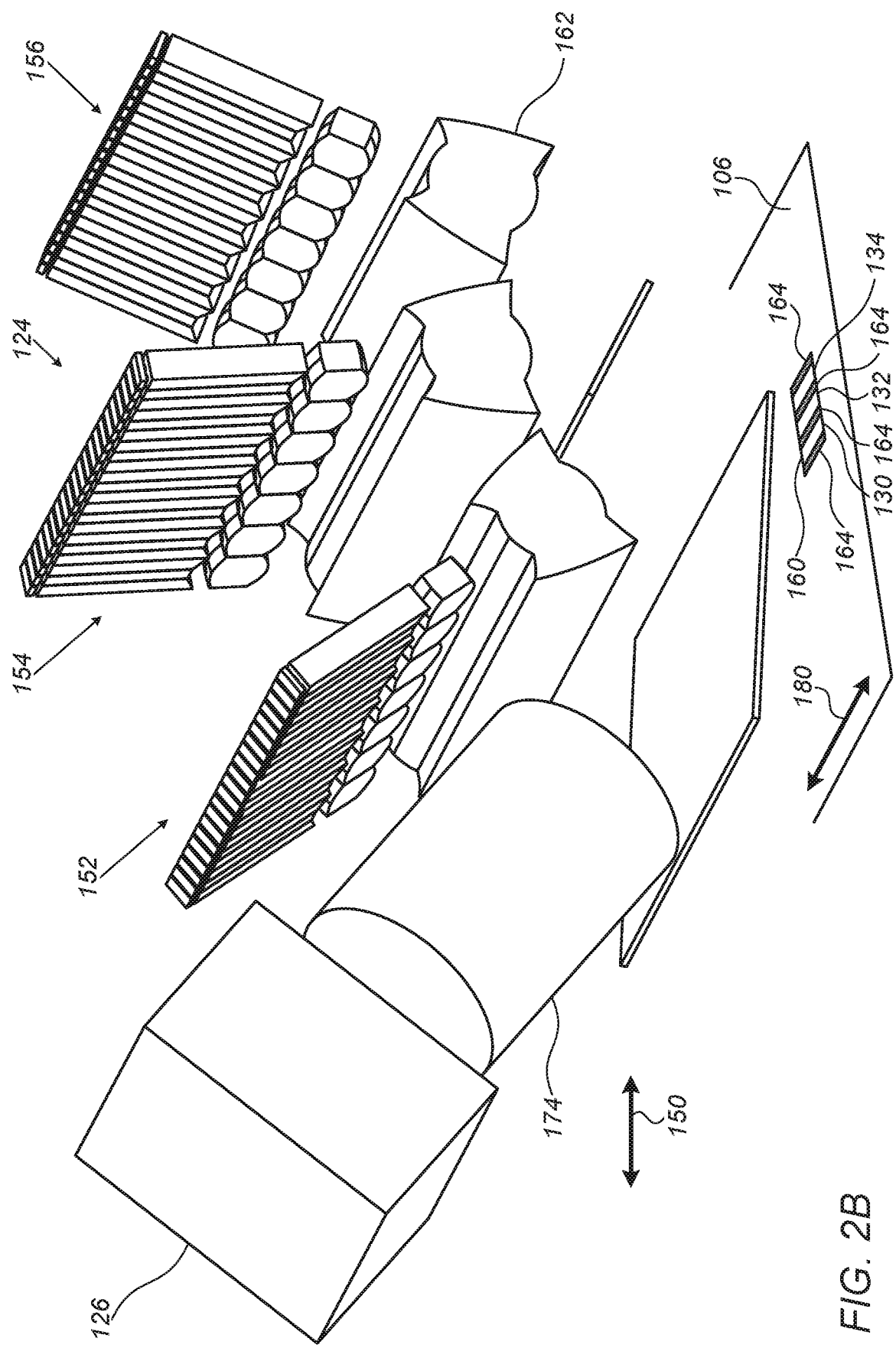

Further details pertaining to the structure and operation of system 100 may be best understood with additional reference to FIGS. 2A and 2B, which are simplified respective front and perspective view illustrations of illumination and image acquisition components in an optical inspection system of the type illustrated in FIGS. 1A and 1B.

Turning now to FIGS. 2A and 2B, illuminator 124 is seen to comprise a first light module 152 illuminating first area 130 of substrate 106, a second light module 154 illuminating second area 132 of substrate 106 and a third light module 156 illuminating third area 134 of substrate 106. First, second and third areas 130, 132, 134 preferably lie within a field of view (FOV) 160 of camera 126. FOV 160 of camera 126 is thus effectively segmented in a direction generally parallel to scan direction 150 into three areas 130, 132, 134, each of which areas is preferably illuminated by a corresponding one of light modules 152-156.

Each of first, second and third light modules 152, 154, 156 is preferably arranged to respectively illuminate first, second and third areas 130, 132 and 134 from mutually different angles, thus providing three mutually different angular modalities of illumination to FOV 160. The mutually different angular modalities are preferably provided simultaneously by illuminator 124 in a direction along scan direction 150. As seen most clearly in FIG. 2A, the three angular modalities provided by illuminator 124 preferably collectively provide full approximately ±45° coverage in scan direction 150.

Each of light modules 152, 154, 156 preferably comprises an astigmatic concentrator 162, projecting a strip of light onto the corresponding area of FOV 160 illuminated thereby. Astigmatic concentrator 162 may be of a type described in U.S. Pat. No. 7,641,365, entitled 'Linear Light Concentrator', assigned to the same assignee as the present invention and incorporated herein by reference.

It is appreciated that it is the illumination of strip-like or elongate illumination fields 130, 132, 134 by multiple illumination modules 152, 154, 156 that allows the use of highly efficient non-imaging focused astigmatic concentrators 162. Such astigmatic concentrators may provide substantially uniform, shift invariant and non-vignetting light fields over wide angles in a cross-scan direction, thereby obviating the need for wasteful light diffusers or other types of homogenizing optical elements known in the art. Combining several such concentrating elements at various mutually different angles further preferably enables extending the overall angular coverage along scan direction 150. Still further advantages arising from the spatial multiplexing of illumination modules 152, 154, 156 of the present invention, such that each illuminates a separate strip on substrate 106, are detailed henceforth.

It is a particular feature of a preferred embodiment of the present invention that the illumination projected by light modules 152, 154, 156 is thus preferably substantially shift invariant and vignetting-free within the boundaries of the light strip projected by each light module, thus providing near full or full angular coverage over the angular range of each light module.

It is understood that the shift invariance and vignetting-free properties of the light strips projected by light modules 152, 154, 156 hold throughout most of the light strip projected by each module, with the exception of within finite regions at the strip edges in both lateral and longitudinal strip directions, as detailed hereinabove. As a result, the angular distribution of illumination remains substantially invariant irrespective of position within the illuminated strip.

It is appreciated that should optical vignetting be present in the illumination projected by light modules 152, 154, 156, this would create gradually widening angular gaps within the illumination numerical aperture (NA) as the point of observation deviates from the center of each light strip, thus limiting the performance capabilities of illuminator 124 and hence the inspection capabilities of system 100.

The provision of uniform, multi-modal, shift invariant, efficient and at least nearly gap free illumination by preferred embodiments of the present invention is highly advantageous. In contrast to somewhat seemingly comparable narrow angular coverage illumination systems known in the art employing imaging type light concentrators, the present invention preferably provides multi-modal, uniform and shift invariant illumination having wide angular coverage in both scan and cross-scan directions.

The provision by illuminator 124 of substantially uniform, substantially gap-free wide NA illumination over the region sensed by camera 126 is highly advantageous in improving the efficacy of substrate inspection performed by system 100. This is because inspection of electronic substrates typically involves image segmentation, wherein a pattern of one material is distinguished from patterns of other materials or from the underlying substrate material. Such segmentation often requires wide illumination angle, substantially gap-free coverage of the inspected object. By way of example, efficient segmentation of copper traces against the dielectric substrate of a PCB typically requires illumination angular coverage extending over an NA of approximately 0.7, corresponding to a total illumination angle of approximately +45°. Such wide angle substantially gap-free illumination is advantageously provided by preferred embodiments of the present invention.

Furthermore, the ability of each light module 152, 154 and 156 to provide substantially uniform angular coverage is advantageous even in cases where deliberate gaps between the angles covered by each individual module may be desirable. This is because, in embodiments of the present invention, such deliberate gaps may be precisely designed and implemented rather than being the result of uncontrolled vignetting within the illumination field projected by each module, as would typically be the case in conventional illumination systems.

It is understood that illumination of FOV 160 by three light modules 152, 154, 156 and the corresponding effective division of FOV 160 into three illuminated areas 130, 132, 134 as illustrated herein is exemplary only. FOV 160 may be divided into two or more areas and illuminator 124 correspondingly designed, in accordance with the design specification of system 100.

The at least two areas illuminated by illuminator 124 are preferably although not necessarily non-contiguous, as here illustrated to be the case with respect to illuminated strips 130, 132, 134 mutually separated by a series of gaps 164. As seen most clearly in FIG. 2A, light impinging on strips 130, 132, 134 in FOV 160 is preferably reflected therefrom towards a beam splitter 170. Beam splitter 170 is preferably partially transmitting to allow the light produced by light module 154 to be incident on strip 132 of substrate 106, and partially reflecting to allow observation of all illuminated strips 130, 132, 134 by camera 126. Beam splitter 170 is preferably arranged with respect to illuminated strips 130, 132, 134 and gaps 164 so as to minimize illumination non-uniformity and stray light effects introduced by the edges of beam splitter 170. Illuminated strips 130, 132, 134 may have an effective width of approximately 0.5-2 mm.

The effective width, henceforth also simply termed the width, of each illuminated strip may be defined as that region over which the illuminated field is substantially uniform and shift invariant. The effective width is related to both the physical size of the light sources, such as LEDs, and the optical properties of the light concentrator 162 employed within each of light modules 152, 154, 156. As noted hereinabove, the effective width is typically somewhat smaller than the overall spread of the illuminating light energy defining each illuminated strip.

It is understood that the effective width of the strip illuminated by each module 152, 154, 156 is a highly significant parameter, determining the light strobe duty cycle of each imaging modality. This may be appreciated by considering an example in which each pixel row of area sensor 136 included in camera 126 images a 5 μm region in FOV 160. As noted hereinabove, during scanning, substrate 106 is preferably in continuous motion relative to optical head 102. To avoid loss of imaging quality, illuminator 124 is preferably strobed for a period corresponding to a scanning distance substantially similar to the size of the region imaged by a single row of pixels, namely 5 μm in this example. In practice the strobing duration may correspond to a scan distance in the range of 1 μm or even less if allowed by the system light budget, up to about 10 μm without undue loss of imaging quality, depending on the particular application. Should the widths of strips 130, 132, 134 be 1 mm, each illumination modality would be strobed at 1 mm scanning increments, resulting in about a 1:200 strobing duty cycle. It should be noted that this result is irrespective of the number of illumination modalities projected into each of illuminated strips 130, 132, 134, as is detailed hereinbelow with reference to FIG. 5.

Gaps 164 may have a width approximately equal to the widths of strips 130, 132, 134. Further details concerning the preferable placement of beam splitter 170 so as to minimize illumination non-uniformity arising therefrom are provided hereinbelow with reference to FIGS. 7A and 7B.

Light incident on beam splitter 170 is preferably deflected towards a mirror 172, at which mirror 172 the light is preferably reflected towards camera 126. Light is preferably focused on camera 126 by a lens 174, preferably interfacing mirror 172 and camera 126. Sensor 136 within camera 126 preferably detects the incident light reflected from substrate 106. It is appreciated that a single sensor, namely area sensor 136, is thus operative to acquire an image of all of the areas 130, 132, 134 within the FOV 160 of camera 126, which areas are preferably simultaneously illuminated with mutually different angular illumination modalities by illuminator 124. Exemplary suitable sensors useful in preferred embodiments of the present invention include the CMV12000 by AMS Sensors, Belgium and the IMX253LLR by Sony. Cameras equipped with these sensors are available from such suppliers as Basler of Germany, Flir and EVT of BC, Canada.

Lens 174 is preferably a telecentric imaging lens having a magnification in the range 0.3×-3×. Since the optical path between FOV 160 and lens 174 is preferably entirely in air, lens 174 may be embodied as a commercially available lens having the desired magnification, resolution and FOV. Alternatively, for specialized applications a suitable lens may be custom designed and produced to specifications by such manufacturers as Qioptiq Photonics GmbH & Co KG and Jos. Schneider Optische Werke GmbH of Germany.

It is a particular feature of preferred embodiments of the present invention that in addition to the plurality of angular modalities of illumination provided by illuminator 124 in scan direction 150, illuminator 124 is preferably additionally configured and operative to provide additional sub-angular illumination modalities in a cross-scan direction 180, generally orthogonal to scan direction 150. Additional sub-angular illumination modalities provided in cross-scan direction 180 may include one or more of different polarization encoded modalities, different wavelength encoded modalities, different time multiplexed modalities, or any other variable modality of illumination for encoding the different angular illumination modalities, as may be known to one skilled in the art.

The wide illumination angular coverage provided by illuminator 124 is thus preferably split into multiple, individually switchable and sensed illumination modalities, each illumination modality preferably illuminating a single discrete segment of substrate 106, such as areas 130, 132, 134 arrayed along scan direction 150. Each scan-direction angular segment is preferably further split into a number of angular sub-segments arrayed along cross-scan direction 180. Each angular segment and sub-segment preferably constitutes an independently switchable illumination modality, wherein crosstalk between the various modalities may be minimized by employing one or more of temporal, wavelength and polarization encoding schemes.

Simultaneous activation of all of the angular segments leads to restoration of the full substantially uniform substantially gap free wide NA illumination, as may be required for efficient pattern distinguishing. The totality of illumination modalities incident on each portion of substrate 106 is subsequently demultiplexed computationally by computer 142, to produce a multi-modal imagery of the inspected substrate 106.

It is appreciated that the present invention thereby provides substantially uniform, substantially gap free and substantially shift invariant multi-modality illumination over a wide angle, compatible with area type image sensors operated in a continuous scanning mode.

The illumination of substrate 106 with multi-modality light oriented at variable and well-defined angles in both scan direction 150 and cross-scan direction 180 may be useful for aiding accurate characterization of possible defects on substrate 106. Particularly, the use of an increased number of illumination modalities improves identification of actual defects and reduces false positive identifications of benign substrate features. Furthermore, separating the illumination segments along scan direction 150 also facilitates the construction of the illuminator by avoiding physical obstructions, as is further detailed henceforth with reference to FIGS. 7A and 7B.

Methods by which different cross-scan illumination angles may be multiplexed using different wavelengths or polarizations are further described below in relation to FIGS. 11A, 11B, 11C and 12A and 12B, respectively. The division of scan-direction angle modalities among the separate areas 130, 132, 134 is described below in relation to FIGS. 7, 8, 9 and 10.

Figure 3:
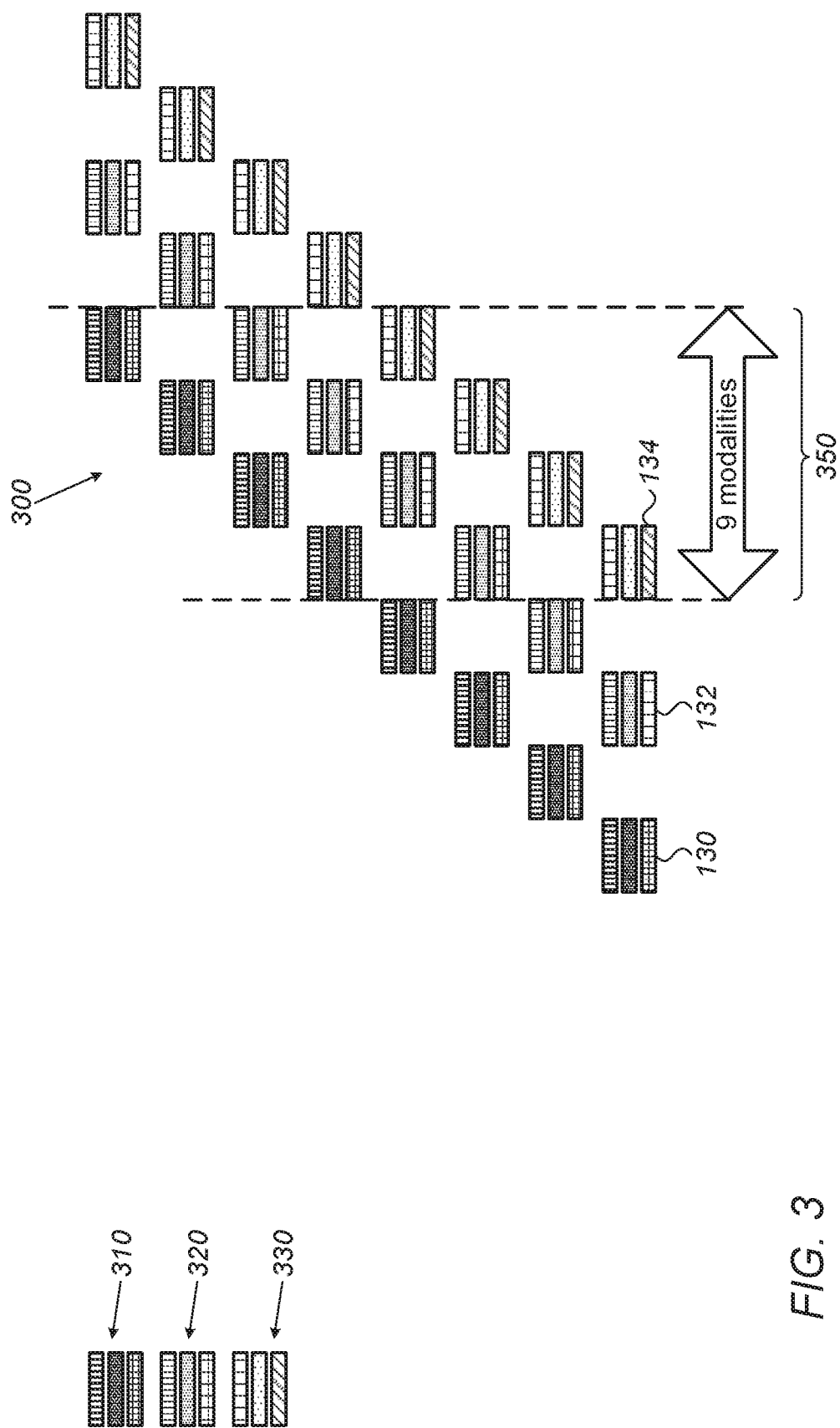
FIG. 3 is a simplified space-time chart illustrating multimodality multiplexed illumination in accordance with a preferred embodiment of the present invention.

Reference is now made to FIG. 3, which is a simplified space-time chart illustrating multimodality multiplexed illumination in accordance with a preferred embodiment of the present invention.

As seen in FIG. 3, an example of multimodality multiplexed illumination provided by system 100 may be represented in the form of a space-time chart 300. The horizontal axis of chart 300 extends in scan direction 150 and the vertical axis of chart 300 indicates time or frame count.

In the exemplary illumination regime charted in FIG. 3, the three angular modalities of illumination respectively delivered to three spatial regions 130, 132, 134 along scan direction 150 are complemented by three wavelength encoded angles of illumination preferably simultaneously delivered within each of spatial regions 130, 132, 134 along cross-scan direction 180. Particularly preferably, a first group of angular illumination modalities 310 comprising three wavelength encoded channels is preferably delivered to first spatial region 130, a second group of different angular illumination modalities 320 encoded by the same three wavelength channels is preferably delivered to second spatial region 132 and a third group of still different angular illumination modalities 330 encoded by the same three wavelength channels is preferably delivered to third spatial region 134. First, second and third spatial regions 130, 132, 134 are preferably simultaneously illuminated by corresponding ones of the three groups of illumination angular modalities 310, 320, 330 when illuminator 124 is strobed.

At each time step or frame, illuminator 124 is strobed and areas 130, 132, 134 are preferably simultaneously illuminated by respective ones of groups of illumination angular modalities 310, 320, 330, each encoded by three wavelengths of illumination. Illuminated areas 130, 132, 134 are depicted in FIG. 3 as a stack of three horizontal bars representing the three wavelength channels by which each area is illuminated and may be understood as corresponding to a conceptual cross-sectional view of FOV 160 at each instant in time at which illuminator 124 is strobed.

Preferably, each illumination modality illustrated in FIG. 3 is strobed every time the scanning motion traverses an interval corresponding to the width of each of areas 130, 132, 134 in scan direction 150.

Each frame is preferably captured by camera 126. In this case, camera 126 preferably includes multiple ones of sensor 136 for sensing light at each wavelength and beam splitter 170 is preferably configured to partially transmit and reflect at all three wavelength channels.

During and following the strobing of illuminator 124, optical head 102 preferably continuously moves in scan direction 150. Illuminator 124 is preferably strobed at time intervals corresponding to optical head 102 having travelled across a full or almost full width of each of areas 130, 132, 134 in scan direction 150. Each point on substrate 106 included in a demarked region 350 is thus preferably sequentially imaged by camera 126 in each one of three areas 130, 132, 134 and as illuminated by each one of three wavelengths of illumination included in groups 310, 320, 330. Each point on substrate 106 included in demarked region 350 is thus illuminated by a total of nine illumination angular modalities corresponding to three wavelength encoded modalities illuminating each of three spatial regions on substrate 106. It is appreciated that the use of three wavelength modalities as described herein is exemplary only and that two or more than three wavelength encoded modalities may alternatively be used.

It is appreciated that should all three scan-direction angular modalities be incident on the same illuminated strip, as is typically the case in conventional illumination approaches wherein physically separate illumination modules are not employed, illuminator 124 would have be strobed at intervals corresponding to only approximately a third of the width of the illuminated strip between consecutive strobes and only three different modalities be activated at each strobe, in order to avoid cross-talk. This is contrast to the method of the present invention, in which the scan-direction angular modalities are incident on respective, separate strips, allowing nine modalities to be activated at each strobe. Employing an image sensor operating at a fixed frame rate within such a conventional system would thus result in a threefold loss of scanning speed relative to the preferred arrangement of FIG. 3.

Furthermore, scanning speed would further be reduced in such a conventional system due to the increased number of image overlaps required between small strobing increments. The physically separate illumination modules employed in the present invention thus advantageously facilitate increased scanning speed in contrast to conventional illumination systems wherein such physically separate illumination modules are not employed.

Following the scanning of an entire length of substrate 106, substrate 106 may then be incrementally shifted in cross-scan direction 180 preferably by way of motion of table 104, depending on the width of substrate 106 in cross-scan direction 180. The above-described process may then be repeated until the entirety of substrate 106 has been scanned. It is appreciated that should substrate 106 be sufficiently narrow and/or light modules 152, 154, 156 be sufficiently extensive in cross-scan direction 180, system 100 may carry out single-pass scanning of substrate 106, such that no cross-scan direction motion of substrate 106 is required.

Wavelength encoding of illumination angle modalities as described herein may be particularly useful in cases for which the substrate under inspection is substantially wavelength agnostic within the wavelength range employed. For example, in PCB inspection copper reflectance is substantially invariant at wavelengths longer than about 600 nm. Thus wavelength encoding using a number of separate channels included in the range from about 600 nm to about 950 nm may be employed without giving rise to undue reflectance variation artifacts. In such a case, care should be taken to equalize the various modality images with respect to the camera sensor relative response at the respective wavelength. Wavelength encoding of illumination angle modalities may also be useful for color or multi-spectral image acquisition in the case of substrates that are substantially angle agnostic over the wavelength range employed. This may be the case with highly diffuse, quasi Lambertian reflecting surfaces.

Further details concerning the structure and operation of illuminator 124 used to produce such wavelength encoded multi-angular illumination are provided henceforth with reference to FIGS. 8A-9B.

Figure 4:
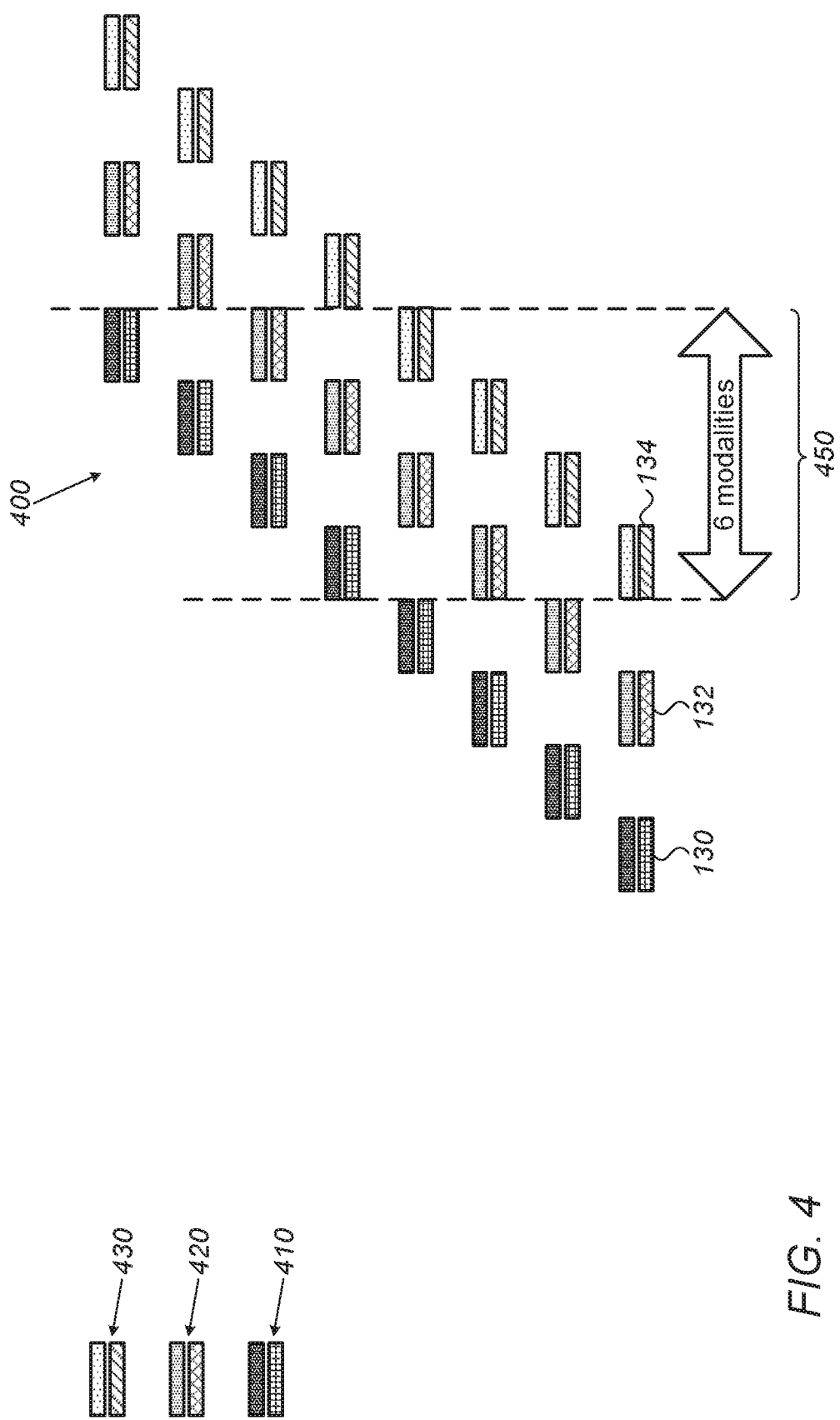
FIG. 4 is a simplified space-time chart illustrating multimodality multiplexed illumination in accordance with another preferred embodiment of the present invention.

Reference is now made to FIG. 4, which is a simplified space-time chart illustrating multimodality multiplexed illumination in accordance with another preferred embodiment of the present invention.

As seen in FIG. 4, an example of multimodality multiplexed illumination provided by system 100 may be represented in the form of a space-time chart 400. The horizontal axis of chart 400 extends in scan direction 150 and the vertical axis of chart 400 indicates time or frame count.

In the exemplary illumination regime charted in FIG. 4, the three angular modalities of illumination corresponding to three spatial regions 130, 132, 134 are complemented by two polarizations of illumination preferably simultaneously delivered within each of spatial regions 130, 132, 134. Particularly preferably, a first group of illumination modalities 410 comprising two polarization encoded angular channels is preferably delivered to first spatial region 130, a second group of different illumination angular modalities 420 comprising the same two polarization encoded channels is preferably delivered to second spatial region 132 and a third group of different illumination angular modalities 430 comprising the same two polarization encoded channels is preferably delivered to third spatial region 134. First, second and third spatial regions 130, 132, 134 are preferably simultaneously illuminated by corresponding ones of the three groups of illumination modalities 410, 420, 430 when illuminator 124 is strobed.

At each time step or frame, illuminator 124 is strobed and areas 130, 132, 134 are preferably simultaneously illuminated by respective ones of groups of illumination angular modalities 410, 420, 430, each including two polarizations of illumination. Illuminated areas 130, 132, 134 are depicted in FIG. 4 as a stack of two horizontal bars representing the two polarization channels by which each area is illuminated and may be understood as corresponding to a conceptual cross-sectional view of FOV 160 at each instant in time at which illuminator 124 are strobed.

Each frame is preferably captured by camera 126. In this case, camera 126 preferably includes a pair of sensors 136 for sensing light at each polarization and beam splitter 170 is preferably configured to partially transmit and partially reflect both polarizations.

During and following the strobing of illuminator 124, optical head 102 preferably continuously moves in scan direction 150. Illuminator 124 is preferably strobed at time intervals corresponding to optical head 102 having travelled across a full or almost full width of each of areas 130, 132, 134 in scan direction 150. Each point on substrate 106 included in a demarked region 450 is thus preferably sequentially imaged by camera 126 in each one of three areas 130, 132, 134 and as illuminated by each one of two polarization encoded illumination angular modalities included in groups 410, 420, 430. Each point on substrate 106 included in demarked region 450 is thus preferably illuminated by a total of six illumination angular modalities corresponding to two polarization modalities illuminating three spatial regions on substrate 106.

It is appreciated that should all six polarization encoded angular modalities be incident on a single strip, as would typically be the case in conventional illumination systems, optical head 102 would have to be incremented by only about a third of the width of the illuminated strip between strobes and only two angular modalities be activated with each strobe to avoid crosstalk.

Following the scanning of an entire length of substrate 106, substrate 106 may then be incrementally shifted in cross-scan direction 180 preferably by way of motion of table 104, depending on the width of substrate 106 in cross-scan direction 180. The above-described process may then be repeated until the entirety of substrate 106 has been scanned. It is appreciated that should substrate 106 be sufficiently narrow and/or light modules 152, 152, 156 be sufficiently extensive in cross-scan direction 180, system 100 may carry out single-pass scanning of substrate 106, such that no cross-scan direction motion of substrate 106 is required.

Polarization encoding of illumination angle modalities as described herein may be particularly useful in cases where the substrate 106 is substantially polarization agnostic within the wavelength range employed. For example, in PCB inspection, copper reflectance varies by only a few percent between mutually perpendicular polarizations at all incidence angles of interest and over visible wavelengths. The typically translucent dielectric substrate tends to depolarize the incident light upon reflection and is largely agnostic to angle of incidence.

Furthermore, in angle agnostic applications, polarization encoded illumination may be useful in analyzing the type of material at each location on substrate 106. For example, polarization encoded illumination as described herein may be useful in the inspection of patterned substrates comprising relatively thin and flat diffusely reflecting metal or dielectric films, as are typically created by the deposition of thin metal or dielectric films on optically rough ceramic, solar wafers or flexible plastic substrates.

Further details concerning the structure and operation of illuminator 124 used to produce such multi-polarized illumination are provided henceforth with reference to FIGS. 12A and 12B.

Figure 5:
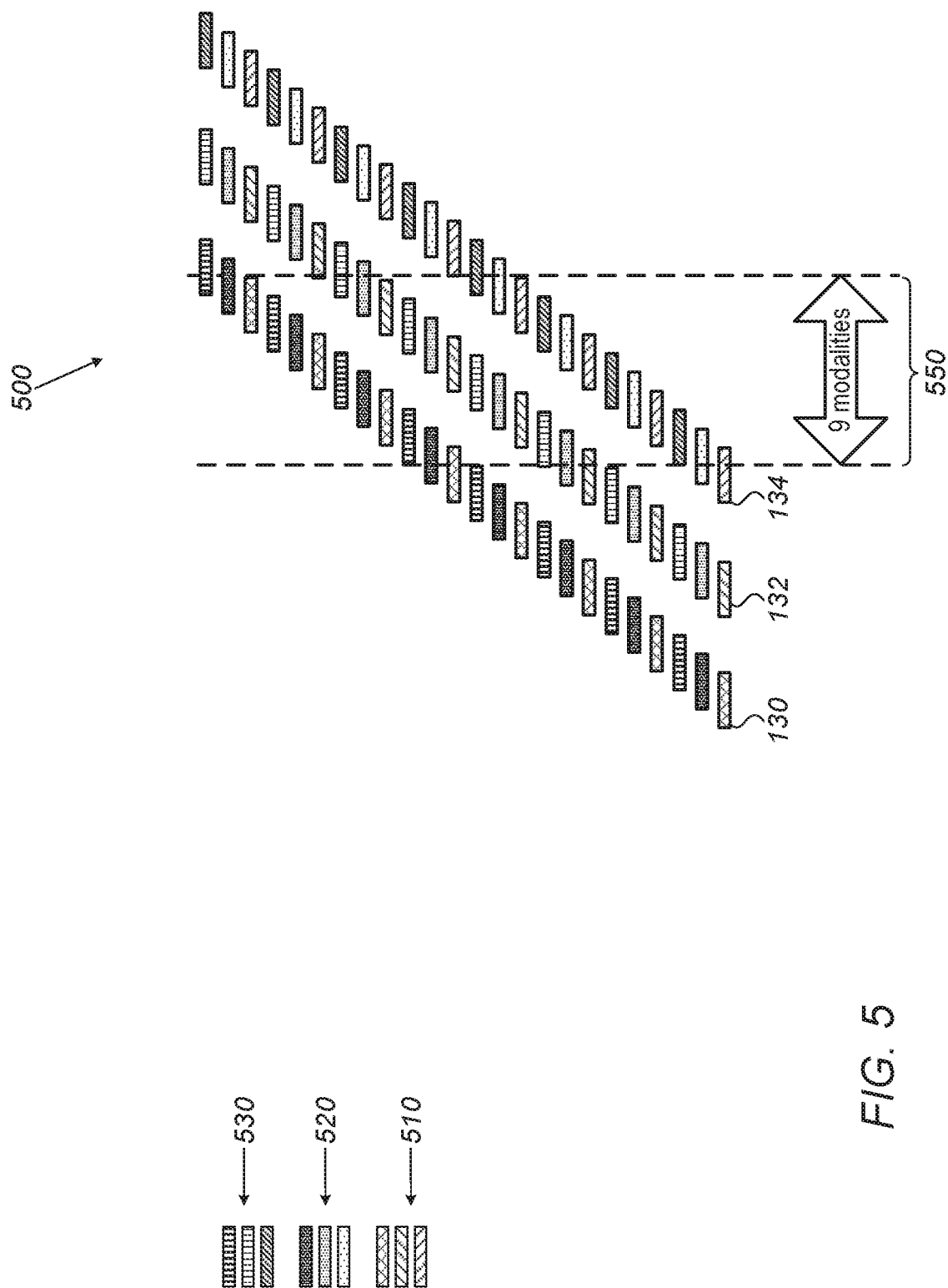
FIG. 5 is a simplified space-time chart illustrating multimodality multiplexed illumination in accordance with a further preferred embodiment of the present invention.

Reference is now made to FIG. 5, which is a simplified space-time chart illustrating multimodality multiplexed illumination in accordance with yet another preferred embodiment of the present invention.

As seen in FIG. 5, an example of multimodality multiplexed illumination provided by system 100 may be represented in the form of a space-time chart 500. The horizontal axis of chart 500 extends in scan direction 150 and the vertical axis of chart 500 indicates time or frame count.

In the exemplary illumination regime charted in FIG. 5, the three scan-direction 150 angular modalities of illumination corresponding to three spatial regions 130, 132, 134 are each complemented by three different cross-scan direction 180 angular modalities. The cross-scan direction angular modalities are preferably sequentially delivered at time steps within each of spatial regions 130, 132, 134. Particularly preferably, a first group of illumination modalities 510 comprising three angular modalities is preferably delivered to spatial regions 130, 132, 134 at one point in time, a second group 520 comprising three different angular modalities is preferably delivered to spatial regions 130, 132, 134 at another point in time following the delivery of first group 510 and a third group 530 comprising three still different angular modalities is preferably delivered to spatial regions 130, 132, 134 at yet another point in time following the delivery of second group 520.

First, second and third spatial regions 130, 132, 134 are preferably simultaneously illuminated by respective ones of the individual modalities of one of the three groups of illumination modalities 510, 520, 530, when illuminator 124 is strobed, sequentially with respect to the three groups 510, 520, 530.

Illuminated areas 130, 132, 134 are depicted in FIG. 5 as horizontal bars representing the individual illumination modality by which each area is illuminated and may be understood as corresponding to a conceptual cross-sectional view of FOV 160 at each instant in time at which illuminator 124 is strobed. Each frame is preferably captured by camera 126. In this case, camera 126 preferably includes a monochrome sensor 136 for detecting incoming light.

During and following the strobing of illuminator 124, optical head 102 preferably continuously moves in scan direction 150. Illuminator 124 is preferably strobed at time intervals corresponding to optical head 102 having travelled a distance of approximately a third of a way across of each of areas 130, 132, 134 along scan direction 150, but with different groups of illumination modalities being delivered at each strobe. As appreciated from consideration of FIG. 5, each modality of groups of illumination modalities 510, 520 and 530 is preferably strobed at intervals corresponding to the full width across each of areas 130, 132, 134. Hence, the duty cycle of illuminator 124 is determined by the full width of each of areas 130, 132, 134, as noted hereinabove.

It is understood that as a result of the different groups of illumination modalities 510, 520, 530 being delivered at different points in time with respect to each other, coupled with the continuous motion of illuminator 124 with respect to substrate 106, each group of illumination modalities preferably illuminates a progressively shifted region of each of areas 130, 132, 134. Preferably, there is a small spatial overlap between those regions of each of areas 130, 132, 134 illuminated by groups of illumination modalities 510, 520, 530, in order to allow for accurate subsequent image reconstruction.

Each point on substrate 106 included in a demarked region 550 is thus preferably imaged by camera 126 in each one of three areas 130, 132, 134 and as illuminated at three points in time within each area. Each point on substrate 106 included in demarked region 550 is thus illuminated by a total of nine illumination modalities corresponding to three temporal modalities illuminating three spatial regions on substrate 106. It is appreciated that the use of three time steps as described herein is exemplary only and that two or more than two time steps may alternatively be used.

Following the scanning of an entire length of substrate 106, substrate 106 may then be incrementally shifted in cross-scan direction 180 preferably by way of motion of table 104, depending on the width of substrate 106 in cross-scan direction 180. The above-described process may then be repeated until the entirety of substrate 106 has been scanned. It is appreciated that should substrate 106 be sufficiently narrow and/or light modules 152, 154, 156 be sufficiently extensive in cross-scan direction 180, system 100 may carry out single-pass scanning of substrate 106, such that no cross-scan direction motion of substrate 106 is required.

It is understood that the system throughput in the embodiment charted in FIG. 5 is slower than those charted in FIGS. 3 and 4, due to the performance of smaller incremental scan steps. However, it is appreciated that should all nine angular modalities be incident on a single strip, rather than being grouped in three groups respectively incident on three individual strips, optical head 102 would have to be incremented by only about a ninth of the width of the illuminated strip between strobes and only a single angular modality be activated at each strobe in order to avoid crosstalk. The increased number of scanning increments that would be required by such a system, coupled with the need to ensure a finite spatial overlap between successive exposures as noted above, would result in a significantly slower scanning speed than that preferably achieved in the present invention, as charted in FIG. 5.

Further details concerning the structure and operation of illuminator 124 used to produce such time stepped illumination are provided henceforth with reference to FIGS. 8A-9B.

Figure 6:
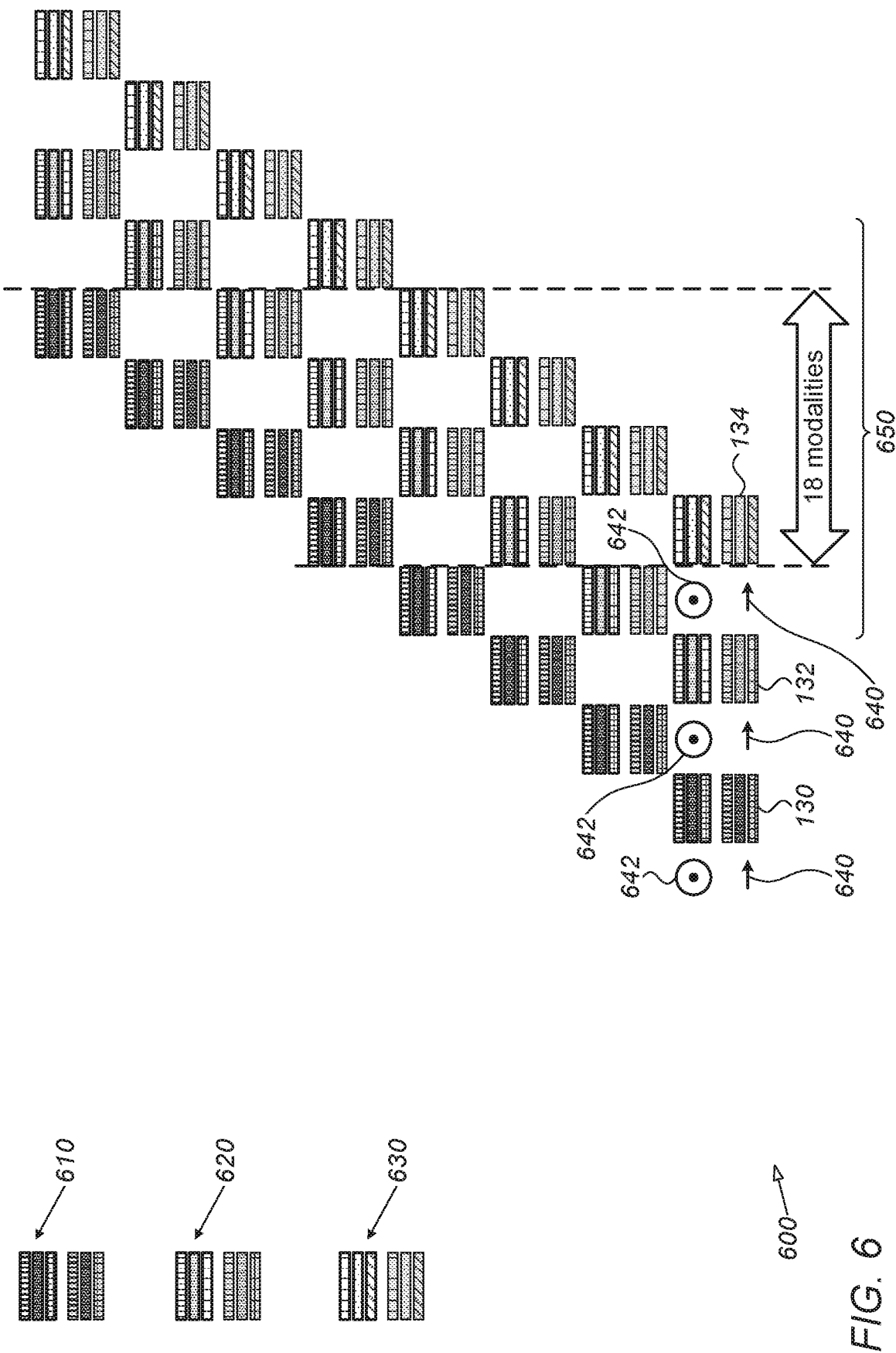
FIG. 6 is a simplified space-time chart illustrating multimodality multiplexed illumination in accordance with yet another preferred embodiment of the present invention.

It is appreciated that various ones of the different illumination modalities charted in FIGS. 3-5 may be combined to achieve yet higher orders of multimodality illumination. By way of example only, the combination of different polarization modalities with different wavelength modalities is illustrated in FIG. 6. Turning now to FIG. 6, an example of multimodality multiplexed illumination provided by system 100 may be represented in the form of a space-time chart 600. The horizontal axis of chart 600 extends in scan direction 150 and the vertical axis of chart 600 indicates time or frame count.

In the exemplary illumination regime charted in FIG. 6, each of the three spatial regions 130, 132, 134 is illuminated by two polarization encoded channels, each polarization encoded channel comprising three wavelength encoded angular modalities, preferably simultaneously delivered to each of spatial regions 130, 132, 134. Particularly preferably, a first group of illumination modalities 610 comprising a total of six wavelength and polarization encoded channels is preferably delivered to first spatial region 130, a second group of illumination modalities 620 comprising different angle modalities encoded by the same six wavelength and polarization channels is preferably delivered to second spatial region 132 and a third group of illumination modalities 630 comprising yet different angle modalities encoded by the same six wavelength and polarization channels is preferably delivered to third spatial region 134. First, second and third spatial regions 130, 132, 134 are preferably simultaneously illuminated by corresponding ones of the three groups of illumination modalities 610, 620, 630 when illuminator 124 is strobed.

At each time step or frame, illuminator 124 is strobed and areas 130, 132, 134 are preferably simultaneously illuminated by respective ones of groups of illumination angle modalities 610, 620, 630, each including three wavelengths of illumination having two polarizations. Illuminated areas 130, 132, 134 are depicted in FIG. 6 as a stack of six horizontal bars representing the three wavelengths each at two polarizations by which each area is illuminated, and may be understood as corresponding to a conceptual cross-sectional view of FOV 160 at each instant in time at which illuminator 124 is strobed.

The two orthogonal polarizations by which the various angular modality groups are encoded are respectively indicated by reference numbers 640 and 642 in FIG. 6. FIG. 6 shows an exemplary case of two linear polarizations, where 640 denotes a linear polarization pointing in scan direction 150 and 642 denotes a linear polarization pointing in cross-scan direction 180. It is understood that other orthogonal polarization encoding schemes may alternatively be employed.

Each frame is preferably captured by camera 126. During and following the strobing of illuminator 124, optical head 102 preferably continuously moves in scan direction 150. Illuminator 124 is preferably strobed at time intervals corresponding to optical head 102 having travelled across a full or almost full width of each of areas 130, 132, 134 in scan direction 150. Each point on substrate 106 included in a demarked region 650 is thus preferably imaged by camera 126 in each one of three areas 130, 132, 134 and as illuminated by each one of six wavelength and polarization encoded angle modalities of illumination included in groups 610, 620, 630. Each point on substrate 106 included in demarked region 650 is thus illuminated by a total of eighteen illumination modalities corresponding to six wavelength and polarization encoded modalities illuminating each of three spatial regions on substrate 106.

It is appreciated that alternative combinations of different illumination modalities in addition to those charted in FIG. 6 are also possible. Thus, by way of example, different wavelength encoded modalities illuminating a plurality of spatial regions as illustrated in FIG. 3 may be combined with different temporal modalities as illustrated in FIG. 5 to achieve a greater number of modalities of illumination; different polarization encoded modalities illuminating a plurality of spatial regions as illustrated in FIG. 4 may be combined with different temporal modalities as illustrated in FIG. 5; and all of polarization, wavelength and time step modalities may alternatively be combined.

It is understood that the greater the number of illumination modalities used to illuminate substrate 106, the greater the accuracy and resolution of inspection thereof, although in certain cases the system throughput may be slower as the number of modalities is increased.

Reference is now made to FIGS. 7A and 7B, which are simplified respective front and perspective view illustrations of an arrangement of optical elements shown with respect to illumination output of a system of the type shown in FIGS. 1A-2B.

As seen in FIGS. 7A and 7B, illumination output from illuminator 124 (not shown), here illustrated as comprising three illumination beams 700, 702, 704, is preferably incident on at least two areas, here illustrated as comprising three illuminated areas 130, 132, 134 on substrate 106. It is particularly advantageous feature of a preferred embodiment of the present invention that beams 700, 702, 704 and corresponding illuminated areas 130, 132, 134 are preferably non-contiguous due to the physical spacing between and orientation of light modules 152, 154, 156. Beam splitter 170 may thus be positioned with respect to beams 700, 702, 704 such that the edges 710 of beam splitter 170 lie in the spaces between beams 700, 702, 704 rather than within the beams. The positioning of edges 710 of beam splitter 170 between rather than within the beams of light 700, 702, 704 serves to minimize the illumination non-uniformity and stray light introduced by edges 710. The optimum positioning of beam splitter 170 is preferably selected based on allowing uninterrupted exposure of areas 130, 132, 134 to illumination, taking into account the attenuation of area 132 illumination, and non-vignetted capture of illumination reflected from areas 130, 132, 134 by camera 126.

It is noted that beam 700 is preferably divided in cross-scan direction 180 into three spatially overlapping but angularly substantially distinct sub-beams, omitted from FIG. 7B for the sake of clarity of presentation. The formation of such cross-scan modalities in various embodiments is illustrated in FIGS. 11A to 13. These sub-beams represent the various different illumination modalities provided in cross-scan direction 180 by illuminator 124. The sub-beams of beam 700 may comprise sub-beams of three different wavelengths simultaneously illuminating area 130, in accordance with the illumination regime charted in FIG. 3; sub-beams of two different polarizations simultaneously illuminating area 130, in accordance with the illumination regime charted in FIG. 4; or sub-beams delivered at different points in time, sequentially illuminating area 130, in accordance with the illumination regime charted in FIG. 5.

It is appreciated that similar sub-beams would preferably comprise each of beams 700, 702, 704. It is additionally appreciated that each of beams 700, 702, 704 may be sub-divided into two or more sub-beams in cross-scan direction 180 in accordance with the number of illumination modalities provided in cross-scan direction 180. The formation of cross-scan sub-beams is further detailed in relation to FIGS. 11-13 hereinbelow. Furthermore, it is appreciated that although three beams 700, 702, 704 are illustrated in FIGS. 7A and 7B, illuminator 124 may include two or more light modules providing two or more beams in scan direction 150 of different angular modalities, each of which beams is sub-divided into at least two illumination modalities in cross-scan direction 180.

Preferably, although not necessarily, beams 700, 702 and 704 subtend slightly overlapping angles of incidence in scan direction 150, as seen in FIG. 7A, so as to ensure that the combined illumination effect following the merging of overlapping images by processor 128 is free of angular gaps. As apparent from consideration of FIGS. 7A and 7B, an optical axis 720 of imaging lens 174 and camera 126 is preferably slanted at an oblique angle relative to substrate 106. This configuration advantageously leaves space for beam 700 forming optical elements. Furthermore, this configuration facilitates a short working distance for lens 174, thus allowing lens 174 to achieve high resolution imaging at relatively low cost and complexity. Inspection systems incorporating illumination and imaging subsystems constructed and operative in accordance with preferred embodiments of the invention are particularly useful for high resolution substrate inspection of features of 30 microns or less, and more particularly 15 microns or less.

Figure 8A:
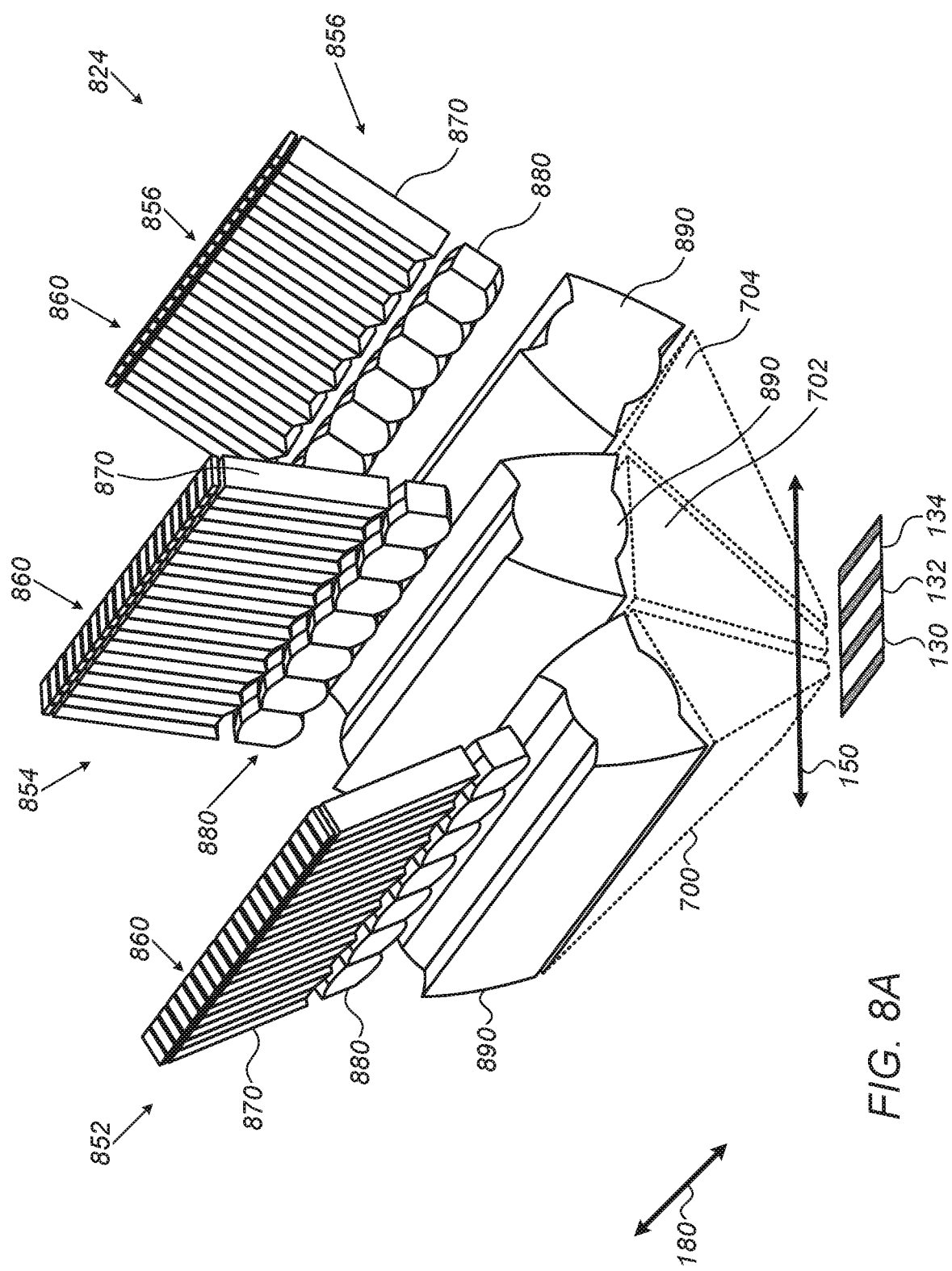
Figure 8C:
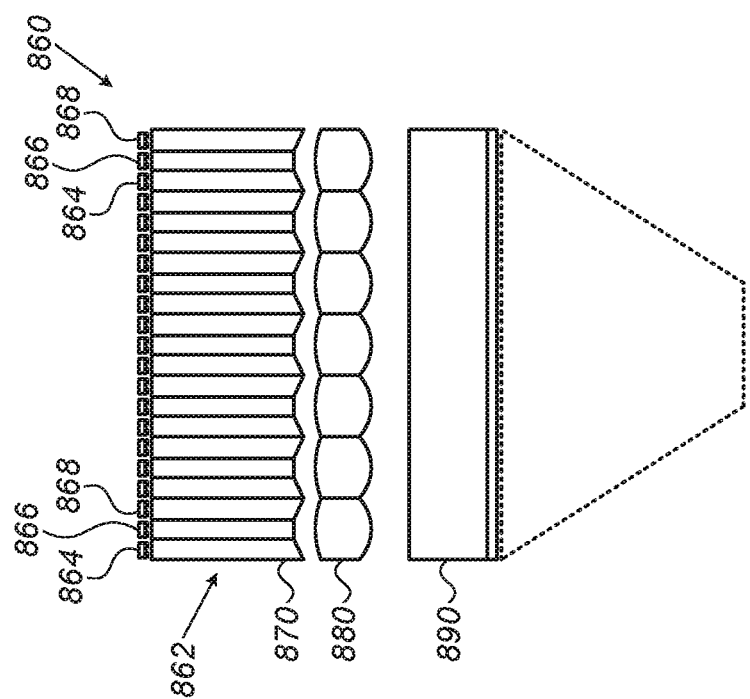
Figure 8B:
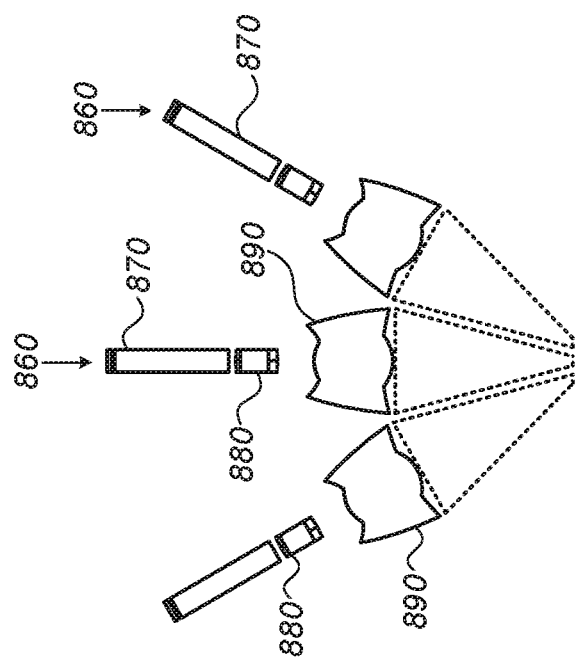

Reference is now made to FIGS. 8A-8C, which are simplified perspective, front and side view illustrations of a multimodality illuminator constructed and operative in accordance with a preferred embodiment of the present invention, suitable for providing multimodality multiplexed illumination of the type illustrated in FIG. 3 or FIG. 4.

As seen in FIGS. 8A-8C, there is provided a multimodality illuminator 824, preferably forming a part of illumination subsystem 120 of the present invention. It is appreciated that multimodality illuminator 824 shown in FIGS. 8A-8C is a particularly preferred embodiment of illuminator 124 forming part of illumination subsystem 120 of system 100.

Multimodality illuminator 824 preferably includes at least two light modules, here embodied, by way of example, as a first light module 852, a second light module 854 and a third light module 856. It is appreciated that light modules 852, 854, 856 are a particularly preferred embodiment of light modules 152, 154, 156 comprising illuminator 124.

First, second and third light modules 852, 854, 856 are preferably although not necessarily mutually identical and are mutually aligned along scan direction 150. Preferably, although not necessarily, first, second and third light modules 852, 854, 856 are physically spaced apart in scan direction 150, as described hereinabove. Each one of light modules 852, 854, 856 preferably extends longitudinally in cross-scan direction 180.

Each light module preferably comprises an array of light sources, here embodied by way of examples as an array of LEDs 860. It is appreciated that other light sources may alternatively be suitable for inclusion in light modules 852, 854, 856, such as super luminescent diodes (SLDs), diode lasers, vertical-cavity surface-emitting lasers (VCSELs) or laser pumped phosphor lamps. The physical light sources may alternatively be coupled to optical fibers or other light guiding or homogenizing elements, where the output ends of those light guides function as effective light sources.

LEDs 860 may emit light at a single common wavelength, in order to produce monochrome illumination in accordance with an illumination regime such as that charted in FIG. 5. Alternatively, LEDs 860 may emit light at different wavelengths. By way of example, LEDs 860 may be arranged in a periodically repeating pattern of units 862. Each unit 862 may comprise a first LED 864 emitting light at a first wavelength, a second LED 866 emitting light at a second wavelength and third LED 868 emitting light at a third wavelength, in order to produce illumination of three different wavelength modalities in cross-scan direction 180, in accordance with an illumination regime such as that charted in FIG. 3.

Each LED 860 is preferably coupled to a light guide 870. Light guide 870 preferably receives light emitted by the corresponding LED 860 mounted thereabove and randomizes the light in order to provide a spatially uniform light distribution. A group of three light guides 870 belonging to unit 862 of LEDs is preferably aligned with respect to a light shaping element 880. Light shaping element 880 preferably receives the uniform light output by the light guides 870 associated therewith and provides a light output of a predetermined shape.

The light output from each light shaping element 880 preferably propagates towards an elongate light concentrator element 890, at which elongate light concentrator element 890, light output from all of light shaping elements 880 is preferably concentrated. As described hereinabove, light concentrator element 890 may be a transmissive light concentrator element, preferably of a type described in U.S. Pat. No. 7,641,365, the entirety of which is incorporated herein by reference. Light concentrator element 890 preferably transmits concentrated light illuminating a corresponding one of areas 130, 132, 134 on substrate 106.

FIG. 8D provides further views from additional angles, of multimodality illuminator 824, including views illustrating the passage of illumination therethrough towards areas 130, 132 and 134 on substrate 106.

Figure 9A:
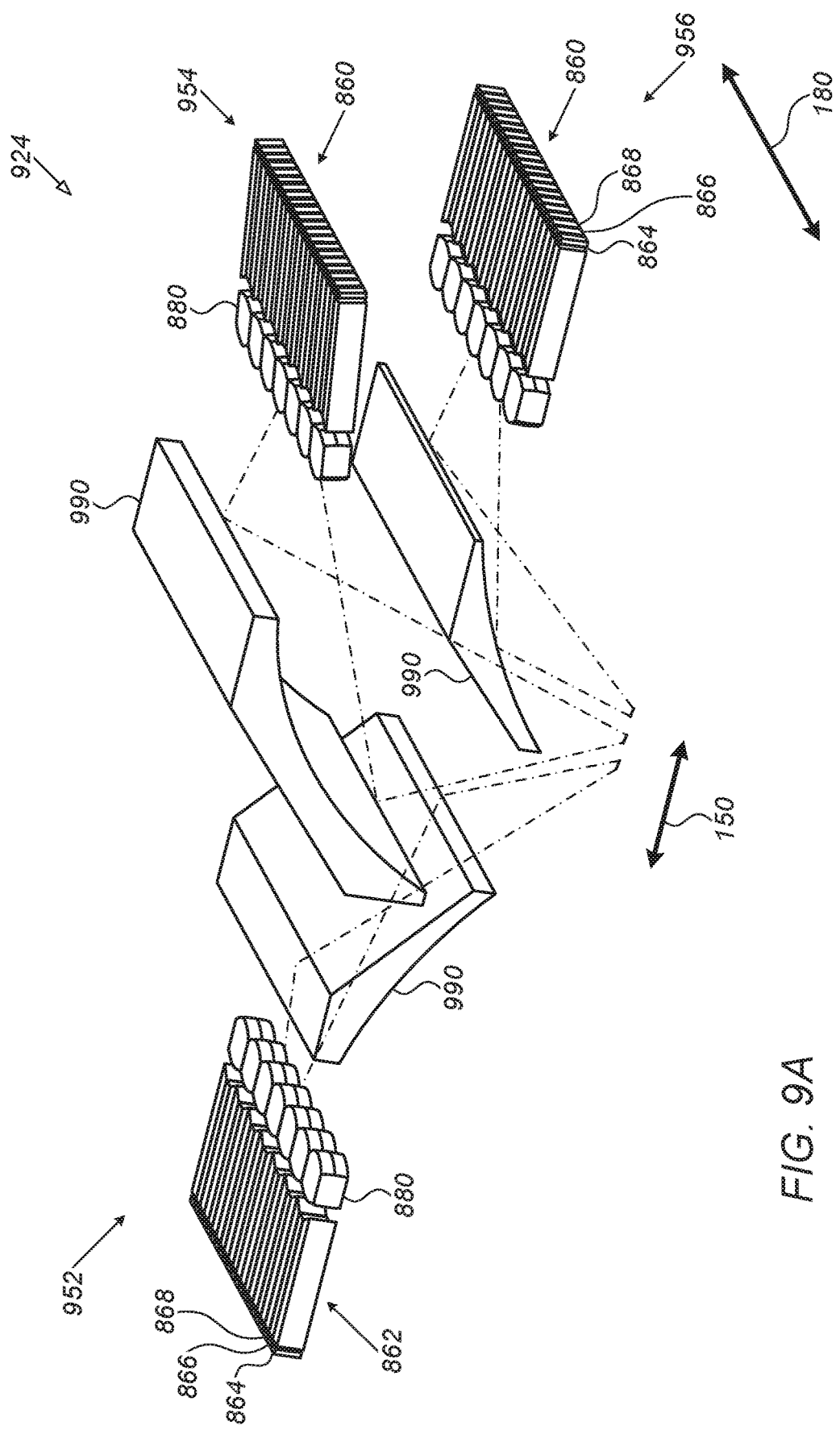
FIGS. 9A and 9B are simplified perspective and front view illustrations of a multimodality illuminator constructed and operative in accordance with another preferred embodiment of the present invention, suitable for providing multimodality multiplexed illumination.
Figure 9B:
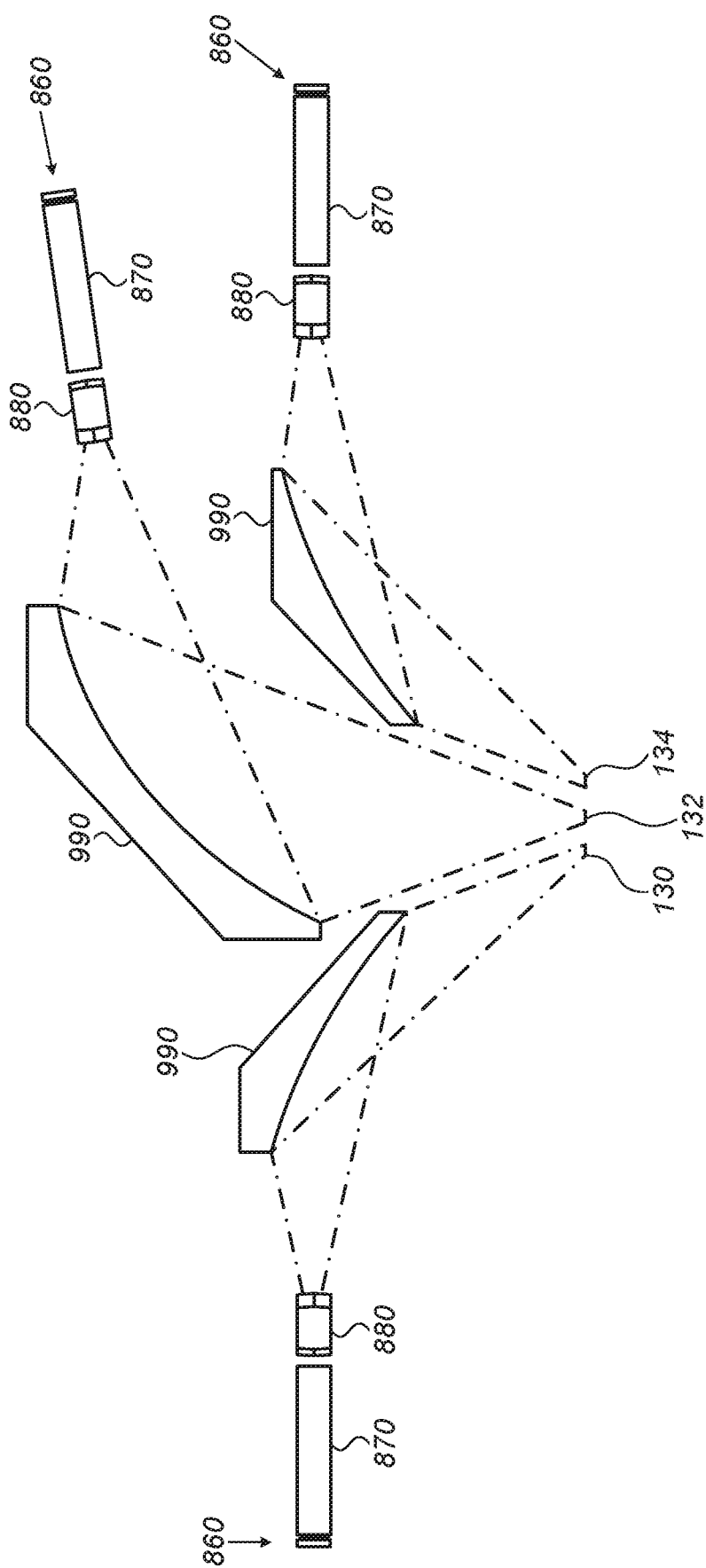

Transmissive light concentrator element 890 may alternatively be embodied as a reflective light concentrator element, as illustrated in FIGS. 9A and 9B.

Turning now to FIGS. 9A and 9B, an alternative embodiment of a multimodality illuminator 924 is shown. Illuminator 924 preferably includes at least two light modules, here embodied, by way of example, as a first light module 952, a second light module 954 and a third light module 956. It is appreciated that light modules 952, 954, 956 are another particularly preferred embodiment of light modules 152, 154, 156 comprising illuminator 124.

First, second and third light modules 952, 954, 956 are preferably although not necessarily mutually identical. Each one of light modules 952, 954, 956 preferably extends longitudinally in cross-scan direction 180. Each light module preferably comprises an array of light sources, here embodied by way of examples as array of LEDs 860. It is appreciated that other light sources may alternatively be suitable for inclusion in light modules 952, 954, 956, such as super luminescent diodes (SLDs), diode lasers, vertical-cavity surface-emitting lasers (VCSELs) or laser pumped phosphor lamps. The physical light sources may alternatively be coupled to optical fibers or other light guiding or homogenizing elements, where the output ends of those light guides function as effective light sources.

LEDs 860 may emit light at a single common wavelength, in order to produce monochrome illumination in accordance with an illumination regime such as that charted in FIG. 5. Alternatively, LEDs 860 may emit light at different wavelengths. By way of example, LEDs 860 may be arranged in a periodically repeating pattern of units 862. Each unit 862 may comprise a first LED 864 emitting light at a first wavelength, a second LED 866 emitting light at a second wavelength and third LED 868 emitting light at a third wavelength, in order to produce illumination of different wavelength modalities in cross-scan direction 180, in accordance with an illumination regime such as that charted in FIG. 3.

Each LED 860 preferably is coupled to a light guide, such as light guide 870. Light guide 870 preferably receives light emitted by the corresponding LED 860 mounted thereabove and randomizes the light in order to provide a spatially uniform light distribution. A group of three light guides 870 belonging to unit 862 of LEDs is preferably aligned with respect to a light shaping element, such as light shaping element 880. Light shaping element 880 preferably receives the uniform light output by the light guides 870 associated therewith and provides a light output of a predetermined shape.

The light output from each light shaping element 880 preferably propagates towards a generally cylindrical light concentrator element 990, at which generally cylindrical light concentrator element 990, light output from all of light shaping elements 880 is preferably concentrated. Light concentrator element 990 may be a reflective light concentrator element, preferably of a type described in U.S. Pat. No. 5,058,982, entitled 'Illumination system and inspection apparatus including same', the entirety of which is hereby incorporated by reference. Light concentrator element 990 preferably reflects concentrated light towards a corresponding one of areas 130, 132, 134 on substrate 106.

For the sake of clarity, FIGS. 9A and 9B do not show an imaging light path. It is understood that fitting an imaging lens and camera to image areas 130, 132, 134 on substrate 106 would preferably involve the addition of at least one folding mirror between a light module such as 952 or 956 and its respective concentrator 990.

It is appreciated that the light output of multimodality illuminators 824 and 924 may be of a single polarization. Alternatively, multimodality illuminators 824, 924 may be configured to provide light output at more than one polarization. For example, multimodality illuminator 824 may be modified to provide light output at multiple wavelengths and two polarizations, as shown in the case of a multimodality polarization-multiplexed illuminator 1024 shown in FIGS. 10A and 10B.

As seen in FIGS. 10A and 10B, multiplexed illuminator 1024 may include six light modules 1030, each of which light modules may be of a type generally resembling light modules 852, 854, 856. Light modules 1030 are preferably paired into three pairs 1032, each of which pairs 1032 includes two of light modules 1030 providing light of a mutually different polarization to a given area, such as area 130, 132, 134 of FOV 160. A multimodality illuminator such as multimodality illuminator 1024 may be useful for providing multimodality wavelength and polarization multiplexed illumination in accordance with an illumination regime of the type charted in FIG. 6.

It is appreciated that although polarization multiplexed illuminator 1024 is shown for a multimodality illuminator of a type resembling multimodality illuminator 824, including transmissive concentrating elements 890, a polarization multiplexed illuminator of a type generally resembling multimodality illuminator 924, including reflective concentrating elements 990, may alternatively be provided in accordance with another preferred embodiment of the present invention.

Multiplexed illuminator 1024 is preferably capable of projecting 18 different angular illumination modalities. However, it is noted that in the case of angle agnostic applications, illuminator 1024 may be useful for multi-spectral imaging of substrate 106. In an exemplary case, the three LED wavelengths of one light module 1030 may be different than the three LED wavelengths of the other light module 1030 belonging to the same pair 1032. An illuminator 1024 designed in this way but not including polarizers may be used for multi-spectral scanning and imaging over up to 18 different wavelengths.

Reference is now made to FIGS. 11A, 11B and 11C, which are simplified diagrams illustrating light output from a portion of an illuminator of a type illustrated in any of FIGS. 8A-10B.

As seen in FIGS. 11A, 11B and 11C, a single light module 1100, preferably embodied as any one of light modules 852, 854, 856, 952, 954, 956, 1030, includes array of LEDs 860, coupled to a series of light guides 870, groups of three of which light guides 870 are coupled to an individual light shaping element 880.

Light shaping element 880 is preferably a freeform cylindrical refractive optical element. Element 880 may be fabricated of glass but is preferably made of injection molded plastic. Groups of elements 880 coupled to adjacent light guides 870 may preferably be fabricated as monolithic arrays of injection molded plastic elements. Elements 880 preferably provide uniform light of predetermined shape distribution to light concentrators, such as transmissive light concentrators 890 (FIGS. 8A-8C) or reflective light concentrators 990 (FIGS. 9A and 9B).

Light module 1100 preferably extends longitudinally in cross-scan direction 180. As described hereinabove, light module 1100 is preferably operative to provide a plurality of cross-scan direction illumination modalities, which cross-scan direction illumination modalities complement the different angular modalities of illumination provided in scan direction 150 by different ones of plurality of illuminators included in multimodality illuminator 824 or 924.

In one illumination regime, described hereinabove with reference to FIG. 3, light module 1100 is preferably operative to provide illumination of at least two, such as three, wavelength encoded modalities in cross-scan direction 180. In this regime, all of first LEDs 864 emitting light at a first wavelength, second LEDs 866 emitting light at a second wavelength and third LEDs 868 emitting light at a third wavelength are simultaneously activated when light module 1100 is strobed. The area of substrate 106 illuminated by light module 1100, such as area 130, 132, 134, is thus simultaneously illuminated by light of three wavelengths, as charted in FIG. 3.

In another illumination regime, described hereinabove with reference to FIG. 5, light module 1100 is preferably operative to provide illumination at at least two, such as three, time steps. In this regime, rather than all of first, second and third LEDs 864, 866, 868 being activated simultaneously each time light module 1100 is strobed, LEDs 864, 866, 868 are preferably activated sequentially. Sequential activation of LEDs 864, 866, 868 is illustrated in FIGS. 11A-11C.

As seen at a first pane 1102 in FIG. 11A, corresponding to strobing of light module 1100 at a first point in time, only one set of LEDs, such as LEDs 864, are activated, thereby outputting light predominantly at a first angle. As seen at a second pane 1104 in FIG. 11B, corresponding to strobing of light module 1100 at a second point in time, only a second set of LEDs, such as LEDs 866 are activated, thereby outputting light predominantly at a second angle. As seen at a third pane 1106 in FIG. 11C, corresponding to strobing of light module 1100 at a third point in time, only a third set of LEDs, such as LEDs 868, are activated, thereby outputting light predominantly at a third angle. It is appreciated that light module 1100 thus may provide illumination having a tri-directional switchable output angle, based on sequential activation of different ones of LEDs 860.

Figure 11G:
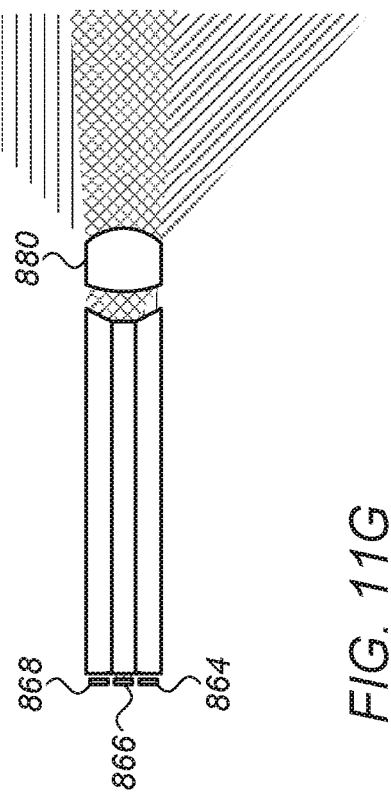
Figure 11E:
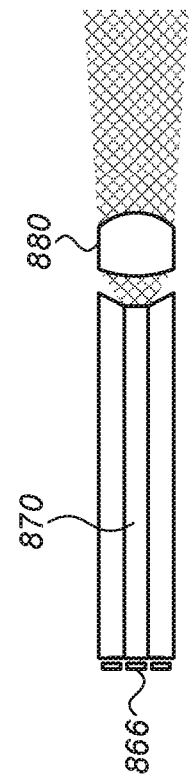
Figure 11D:
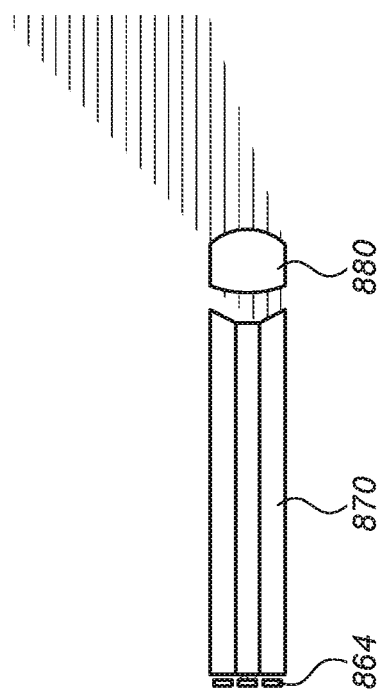
Figure 11F:
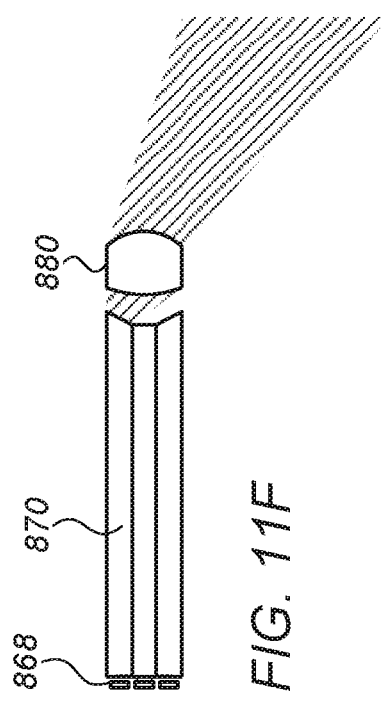

The sequential activation of a single group of three LEDs 864, 866, 868 coupled to three corresponding light guides 870 and a single light shaping element 880 is further illustrated for additional clarity in FIGS. 11D-11F, in which the sequential activation of LED 864 outputting light at a first angle (FIG. 11D), LED 866 outputting light at a second angle (FIG. 11E) and LED 868 outputting light at a third angle (FIG. 11F) is shown. For completeness, the simultaneous activation of the single group of LEDs 864, 866, 868 is shown in FIG. 11G. As mentioned hereinabove, such simultaneous LED activation may correspond to the illumination regime charted in FIG. 3, with each LED emitting illumination at a different wavelength, or the illumination regime charted in FIG. 5, with the LEDs emitting at any wavelength in accordance with the particular application.

The time gap between the points in time corresponding to the illumination represented in first, second and third panes 1102, 1104, 1106 is preferably that time gap during which optical head 102 has moved a distance of approximately a third of the way across each of illuminated areas 130, 132, 134.

In another illumination regime, described hereinabove with reference to FIG. 4, a light module is preferably operative to provide illumination of at least two polarizations in cross-scan direction 180. A single light module 1200, useful for providing such polarization multiplexing, is shown in FIGS. 12A and 12B. As seen in FIGS. 12A and 12B, light module 1200 may generally resemble light module 1100 in relevant aspects of the structure and operation thereof. However, light module 1200 preferably includes a plurality of polarizing filters 1202, mounted on corresponding ones of light guides 870 in order to suitably polarize the light output thereby. Polarizing filters 1202 are preferably arranged in an alternating arrangement between two mutually orthogonal polarizations. Thus, the light output of each light guide 870 is orthogonally polarized with respect to the light output of the adjacent light guide 870 coupled to the same light shaping element 880. Furthermore, units 862 of LEDs 860 coupled to each light shaping element 880 include two individually switchable LEDs 860 corresponding to the two different polarizations, rather than three LEDs 860 as in the case of light module 1100.

Reference is now made to FIG. 13, which is a simplified graphical representation of angular coverage corresponding to light output of a multi-modality illuminator of the type illustrated in FIGS. 7A-9B.

Angular coverage provided by a multimodality illuminator such as illuminator 124, 824 or 924, including three light modules such as light module 1100, is represented in FIG. 13. A first plot 1300 and a second plot 1302 illustrate the collective angular coverage of FOV 160 of camera 126 (FIG. 1B) for two respective positions in cross-scan direction 180. The x-axis of plots 1300 and 1302 represents illumination incidence angle in cross-scan direction 180 and the y-axis represents illumination incidence angle in scan direction 150. As seen in plots 1300 and 1302, angular coverage of FOV 160 may be divided into nine regions corresponding to the nine illumination modalities provided by illuminator 824 or 924.

For the sake of completeness, angular coverage of FOV 160 in the case that only one set of LEDs is activated, such as only either LEDs 864 or LEDs 866 or LEDs 868, is shown in a third plot 1304. In this case, only three modalities of illumination out of the nine are provided, with a single cross-scan modality activated for each of the scan direction modalities. This corresponds to the light output by the activation of LEDs 868 in all three light modules such as 852, 854, 856 of FIGS. 8A-8C.

It should be noted that the angular coverage represented by plots 1300, 1302 and 1304 does not physically exist at one instant of time within the FOV 160. Rather, it is the angular coverage effectively obtained after suitably demultiplexing, processing and merging of the partially overlapping images obtained according to the scanning charts of FIGS. 3 and 5 described above.

Further for the sake of completeness, angular coverage of FOV 160 in the case of only one light module being activated, such as only light module 852 or 854 or 856, is shown in a fourth plot 1306. In this case, only three modalities of illumination are provided in cross-scan direction 180.

As opposed to the three cross-scan modalities shown in plot 1304, all three modalities shown in plot 1306 may physically be activated simultaneously over one sub region such as 134 of FOV 160 under a wavelength multiplexed scheme such as FIG. 3. Alternatively, the angular coverage of plot 1306 may be synthesized by suitably processing and combining three consecutive partially overlapping images acquired according to the scheme of FIG. 5 within a single sub region such as area 134 of FOV 160.

It is appreciated that all or part of the individual preferably partially overlapping images captured by camera 126, may be compiled by image processing and control electronics 128 (FIG. 1B). Image processing and control electronics 128 may perform image calibration and transformation operations as are well known in the art, such as distortion correction, in order to merge the individual multi-modality images into a full angle, composite image.

Other image processing functions performed by control electronics 128 may include calibrating and compensating the individual modality images for differences in light intensity and camera response for the different wavelengths employed in the wavelength multiplexing scheme, and the relative attenuation of the light incident on sub region 132 by beam splitter 170.

In certain embodiments, image processing and control electronics 128 may perform high accuracy sub-pixel image registration in order to produce full angle images. The full angle images may then be used to detect defects in substrate 106 at a high detection rate with few false positives, due to the employment of the plurality of different illumination modalities as described hereinabove.

In certain embodiments, full angular coverage images may be obtained by adding the gray values corresponding to each separate modality at each substrate pixel, after suitable calibration and compensation as noted above. In such embodiments, it should be noted that the slight angular overlap between the various modalities may give rise to brighter contours appearing in images of very shiny and uneven metallic traces. However, the effect of such brighter contours is much less detrimental than would be the occurrence of dark contours resulting from angular gaps in the illumination and may be readily corrected for, by example through the use of non-linear image processing methods such as simple thresholding to even out the effect of brighter contours.

Reference is now made to FIGS. 14, 15, 16A and 16B, which are simplified illustrations of various possible arrangements of optical elements useful for performing demultiplexing of multiplexed illumination provided by a system of any of the types of FIGS. 8A-12.

Turning to FIG. 14, a wavelength demultiplexing imaging scheme 1400 is provided, useful for separating illumination at multiple wavelengths, here illustrated for the case of three wavelengths. Wavelength demultiplexing imaging scheme 1400 may generally resemble a three-chip RGB video camera design, as is well known in the art, and preferably includes a plurality of sensors 1402 in camera 126 for sensing light at each wavelength. A wavelength demultiplexing imaging scheme such as that illustrated in FIG. 14 may be useful for demultiplexing images illuminated by a multimodality illuminator of the types illustrated in FIGS. 8A-9B, providing an illumination regime of the type illustrated in FIG. 3 including 9 illumination modalities.

Figure 15:
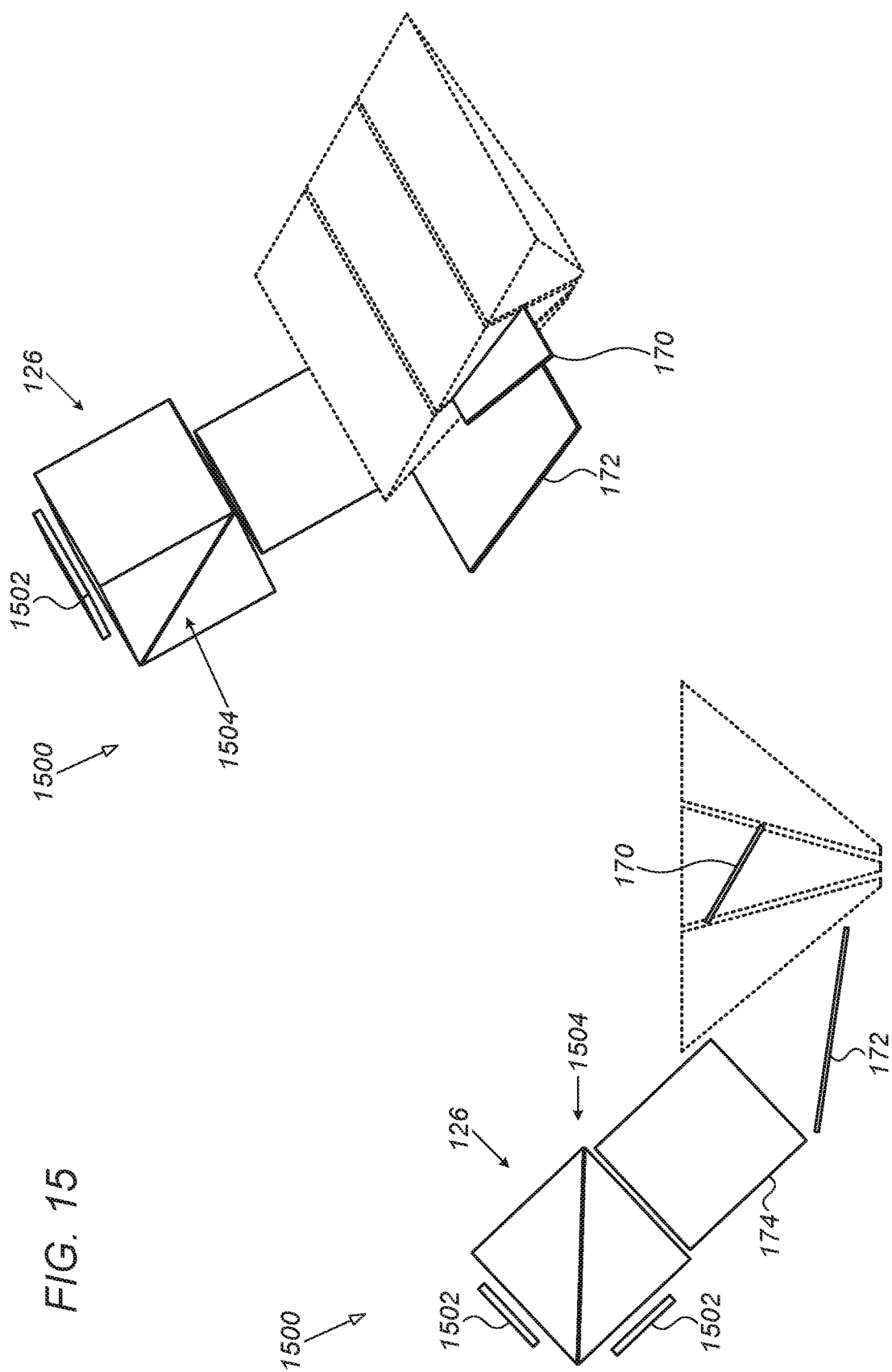

Turning to FIG. 15, a polarization demultiplexing imaging scheme 1500 is provided, useful for separating illumination at two polarizations. Polarization demultiplexing imaging scheme 1500 preferably includes a pair of sensors 1502 in camera 126 for sensing light at each polarization. In this case, a polarizing beam splitter 1504 may be employed. A polarization demultiplexing imaging scheme such as that illustrated in FIG. 15 may be useful for demultiplexing images illuminated by a multimodality illuminator including light modules of the type illustrated in FIGS. 12A and 12B, providing an illumination regime of the type illustrated in FIG. 4 including six illumination modalities.

Figure 16A:
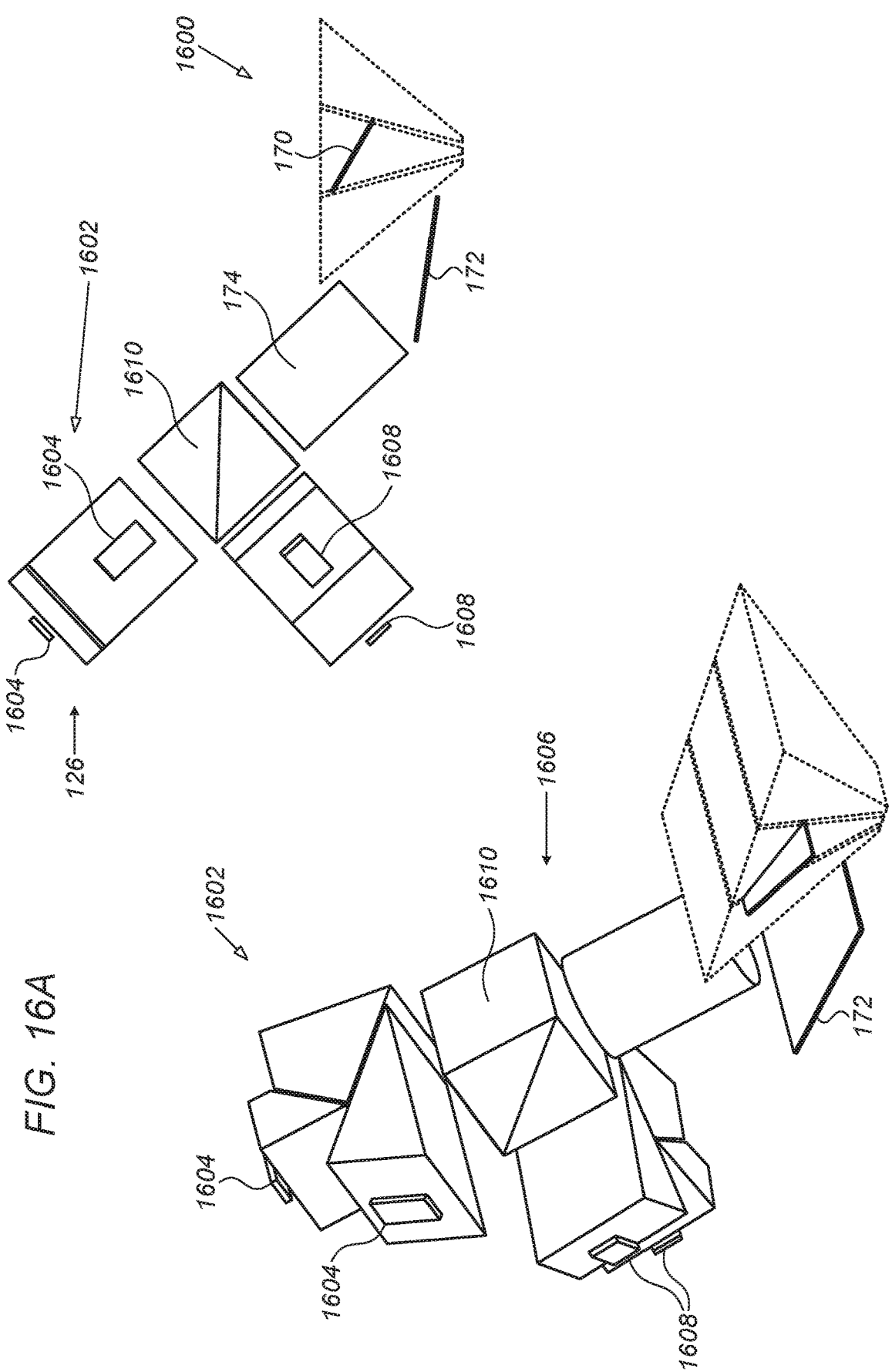
Figure 16B:
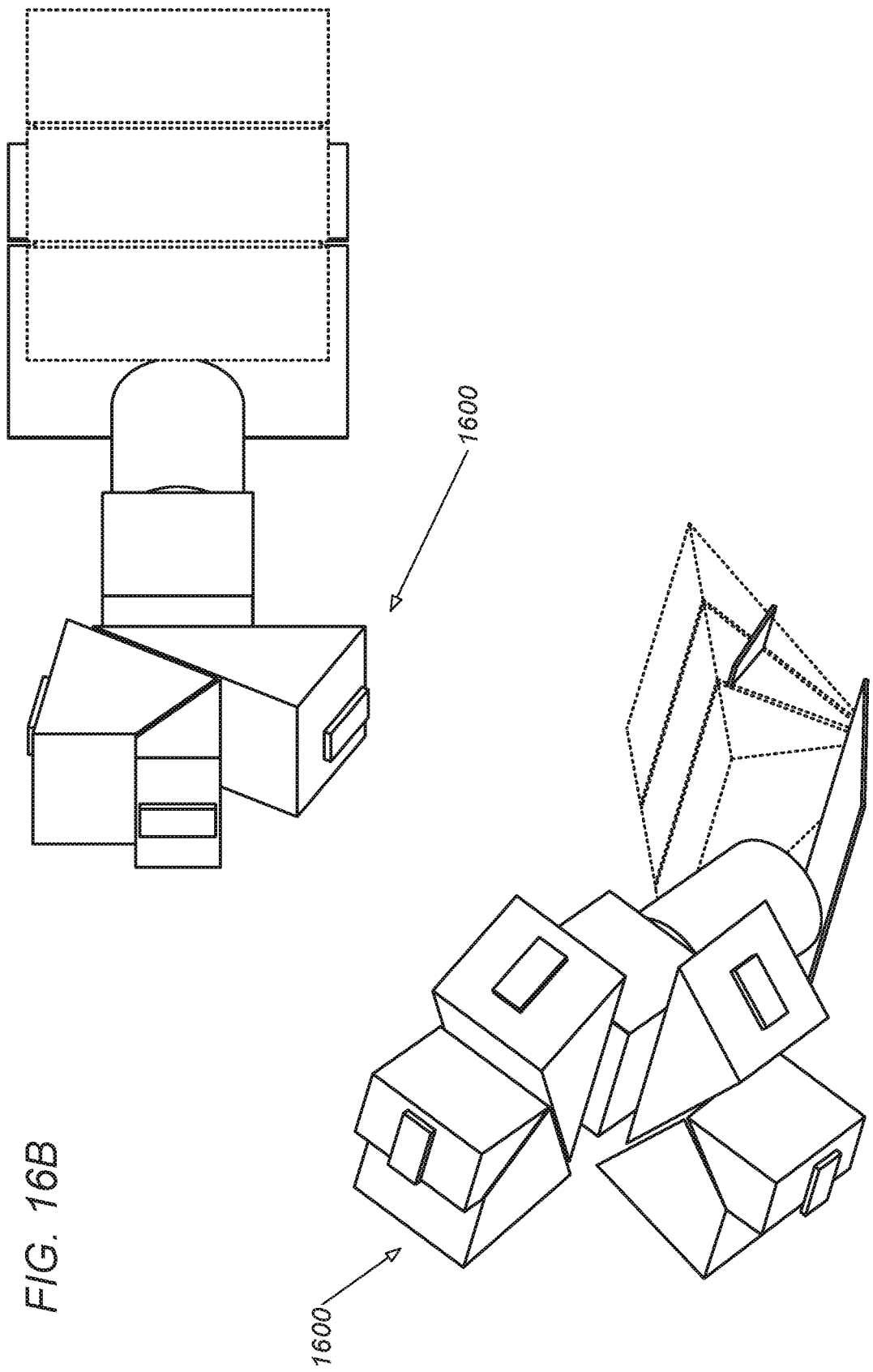

Turning to FIGS. 16A and 16B, a wavelength and polarization demultiplexing imaging scheme 1600 is provided, useful for separating illumination at two polarizations and three wavelengths. Camera 126 in polarization and wavelength demultiplexing imaging scheme 1600 preferably includes a first set of sensors 1602 including a plurality of sensors 1604 for individually sensing light at each wavelength having a first polarization and a second set of sensors 1606 including a second plurality of sensors 1608 for individually sensing light at each wavelength having a second polarization. Scheme 1600 additionally preferably includes a polarizing beam splitter 1610 for separating incoming light at the two different polarizations. A polarization demultiplexing imaging scheme such as that illustrated in FIG. 16 may be useful for demultiplexing images illuminated by a multimodality illuminator of the type illustrated in FIGS. 10A and 10B, providing an illumination regime of the type illustrated in FIG. 6, including 18 illumination modalities.

It will be appreciated by persons skilled in the art that the present invention is not limited by what has been particularly claimed hereinbelow. Rather, the scope of the invention includes various combinations and subcombinations of the features described hereinabove as well as modifications and variations thereof as would occur to persons skilled in the art upon reading the forgoing description with reference to the drawings and which are not in the prior art.

The invention claimed is:

1. An inspection system comprising:
an illuminator;
an image sensing subsystem; and
a beam splitter;
said illuminator providing a plurality of illumination modalities, said inspection system simultaneously illuminating at least two areas of a same surface of an object with different ones of said plurality of illumination modalities, images of which are acquired by a single sensor forming part of said image sensing subsystem,
wherein said illuminator comprises at least two light modules respectively illuminating said at least two areas of said object with said different ones of said plurality of illumination modalities, and said at least two areas of said object are mutually non-contiguous and each of said at least two areas are separated by a non-illuminated gap;
wherein said object and said inspection system are in at least near continuous relative motion along a scan direction;
wherein said at least two light modules are mutually physically spaced apart by spaces along said scan direction and said plurality of illumination modalities comprise different angular modalities of illumination;
wherein said beam splitter is configured to direct illumination from said at least two areas towards said sensor; and
wherein said beam splitter is positioned such that edges thereof lie within said spaces.

2. The inspection system according to claim 1, wherein said sensor comprises an area sensor.

3. The inspection system according to claim 1, wherein each of said light modules includes an array of light sources.

4. The inspection system according to claim 1, wherein said illuminator is strobed to illuminate said at least two areas of said object during said at least near continuous relative motion.

5. The inspection system according to claim 1, wherein each of said at least two light modules provides at least two additional modalities of illumination in a cross-scan direction, generally orthogonal to said scan direction.

6. The inspection system according to claim 5, wherein said at least two additional modalities of illumination comprise different wavelength-encoded modalities, different temporal modalities, and/or different polarization-encoded modalities.

7. The inspection system according to claim 1, wherein said at least two light modules comprise a multiplicity of light sources directing light towards at least one transmissive concentrator element or towards at least one reflective concentrator element.

8. The inspection system according to claim 7, wherein said multiplicity of light sources comprises an array of light sources outputting light to a corresponding array of light guides and an array of light shaping elements, at least one light guide of said array of light guides outputting light to each of said light shaping elements.

9. The inspection system according to claim 1, further comprising image processing and control electronics for processing said images.

10. The inspection system according to claim 9, wherein said processing comprises co-registration of said images and/or demultiplexing of said images.

11. The inspection system according to claim 1, wherein said illumination provided by said illuminator extends over an angular range of at least ±45°.

12. A method for inspecting an object comprising:
simultaneously illuminating at least two areas of a same surface of an object with different ones of a plurality of illumination modalities;
acquiring images of said at least two areas by a single sensor; and
directing illumination from said at least two areas towards said sensor by a beam splitter;
said illuminating being performed by at least two light modules respectively illuminating said at least two areas of said object with said different ones of said plurality of illumination modalities, wherein said at least two areas of said object are mutually non-contiguous and each of said at least two areas are separated by a non-illuminated gap;
wherein said object and said at least two light modules are in at least near continuous relative motion along a scan direction;
wherein said at least two light modules are mutually physically spaced apart by spaces along said scan direction and said plurality of illumination modalities comprise different angular modalities of illumination; and
wherein said beam splitter is positioned such that edges thereof lie within said spaces.

13. The method according to claim 12, wherein said sensor comprises an area sensor.

14. The method according to claim 12, wherein said light modules each includes an array of light sources.

15. The method according to claim 12, wherein said illuminating comprises strobing of said at least two light modules during said at least near continuous relative motion.

16. The method according to claim 12, further comprising illuminating said at least two areas of said object with at least two additional modalities of illumination in a cross-scan direction, generally orthogonal to said scan direction.

17. The method according to claim 16, wherein said at least two additional modalities of illumination comprise different wavelength-encoded modalities, different polarization-encoded modalities, and/or different temporal modalities.

18. The method according to claim 12, wherein said at least two light modules comprise a multiplicity of light sources directing light towards at least one transmissive concentrator element or towards at least one reflective concentrator element.

19. The method according to claim 18, wherein said multiplicity of light sources comprises an array of light sources outputting light to a corresponding array of light guides, at least one light guide of said array of light guides outputting light to each light shaping element in an array of light shaping elements.

20. The method according to claim 12, further comprising processing said images following said acquiring.

21. The method according to claim 20, wherein said processing comprises co-registering said images and/or demultiplexing of said images.

22. The method according to claim 12, wherein said illuminating comprises illuminating over an angular range of at least ±45°.

* * * * *